United States Patent
Iwai

(10) Patent No.: US 12,080,135 B2
(45) Date of Patent: Sep. 3, 2024

(54) TRANSACTION PROCESSING SYSTEM

(71) Applicant: TOSHIBA TEC KABUSHIKI KAISHA, Tokyo (JP)

(72) Inventor: Toshiki Iwai, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 767 days.

(21) Appl. No.: 17/108,232

(22) Filed: Dec. 1, 2020

(65) Prior Publication Data

US 2021/0241590 A1   Aug. 5, 2021

(30) Foreign Application Priority Data

Feb. 3, 2020 (JP) .................................. 2020-016530

(51) Int. Cl.
  *G08B 13/196* (2006.01)
  *G08B 13/14* (2006.01)
  *G08B 13/24* (2006.01)

(52) U.S. Cl.
  CPC ... *G08B 13/19608* (2013.01); *G08B 13/1472* (2013.01); *G08B 13/2454* (2013.01); *G08B 13/246* (2013.01); *G08B 13/2462* (2013.01)

(58) Field of Classification Search
  CPC .............. G08B 13/246; G08B 13/1472; G08B 13/2445; G08B 13/2454; G08B 13/2462; G08B 13/19608
  See application file for complete search history.

(56) References Cited

U.S. PATENT DOCUMENTS

| | | | |
|---|---|---|---|
| 10,373,322 B1 | 8/2019 | Buibas et al. | |
| 10,586,208 B2 * | 3/2020 | Buibas ................... | G01S 17/08 |
| 10,706,699 B1 * | 7/2020 | Kerzner .................. | G06T 7/521 |
| 2015/0029339 A1 | 1/2015 | Kobres et al. | |
| 2016/0019514 A1 | 1/2016 | Landers, Jr. et al. | |
| 2020/0020112 A1 | 1/2020 | Buibas et al. | |
| 2020/0049509 A1 * | 2/2020 | Hill ......................... | G06T 7/579 |

FOREIGN PATENT DOCUMENTS

| | | |
|---|---|---|
| EP | 2975568 A1 | 1/2016 |
| JP | 2019-150123 A | 9/2019 |

OTHER PUBLICATIONS

Extended European Search Report dated Jun. 28, 2021, mailed in counterpart European Patent Application No. 21152834.4, 7 pages.
First Office Action mailed Sep. 18, 2023 in Chinese Patent Application No. 202011280435.8 with English translation, 13 pages.

\* cited by examiner

*Primary Examiner* — Daniel G Mariam
(74) *Attorney, Agent, or Firm* — Kim & Stewart LLP

(57) ABSTRACT

A transaction processing system including a sensing device, one or more cameras, and a processor. The sensing device is configured to detect displacement of a commodity item from a commodity display section. The one or more cameras are configured to capture images around the commodity display section. The processor is configured to track a location of each of one or more customers who is determined to have entered a first area around the commodity display section based on the captured images, and upon detection of the displacement of the commodity item by the sensing device, perform an operation to determine a purchasing customer of the commodity item based on the tracked location of each of the one or more customers, and cause purchase registration of the commodity item in association with an ID of the purchasing customer.

20 Claims, 12 Drawing Sheets

TRANSACTION PROCESSING SYSTEM

CROSS-REFERENCE TO RELATED APPLICATION

This application is based upon and claims the benefit of priority from Japanese Patent Application No. 2020-016530, filed on Feb. 3, 2020, the entire contents of which are incorporated herein by reference.

FIELD

Embodiments described herein relate generally to a transaction processing system.

BACKGROUND

In recent years, labor shortage has been becoming a problem for retail businesses. There is an increasing demand for a system that addresses the labor shortage. To address the issue, various store systems have been proposed. A store system that automatically registers a commodity purchased by a consumer according to an action of the consumer within a store to make commodity registration at a checkout counter or the like unnecessary. Another store system identifies if a commodity has been taken from a shelf (or other display area), and then identifies the consumer who removes the commodity from the shelf, as a purchaser of the commodity. However, with these store systems, it can be necessary to change a store layout and add a large number of cameras, sensors, and the like in order to achieve the unmanned operation over the entire store. The burden on the store side is large for introduction of these store systems. Accordingly, it is desirable that a transaction system address the labor shortage while reducing the upfront burden on the store side associated with adopting a new store system.

DETAILED DESCRIPTION

According to an embodiment, a transaction processing system including a sensing device, one or more cameras, and a processor. The sensing device is configured to detect displacement of a commodity item from a commodity display section. The one or more cameras are configured to capture images around the commodity display section. The processor is configured to track a location of each of one or more customers who is determined to have entered a first area around the commodity display section based on the captured images, and upon detection of the displacement of the commodity item by the sensing device, perform an operation to determine a purchasing customer of the commodity item based on the tracked location of each of the one or more customers, and cause purchase registration of the commodity item in association with an ID of the purchasing customer.

An example of an embodiment is described below with reference to the drawings. In the embodiment, a transaction processing system including shelf-type display racks is described as one example. Further, an example is described in which the transaction processing system processes a transaction in which a purchases a commodity displayed in a store.

Figure 1:
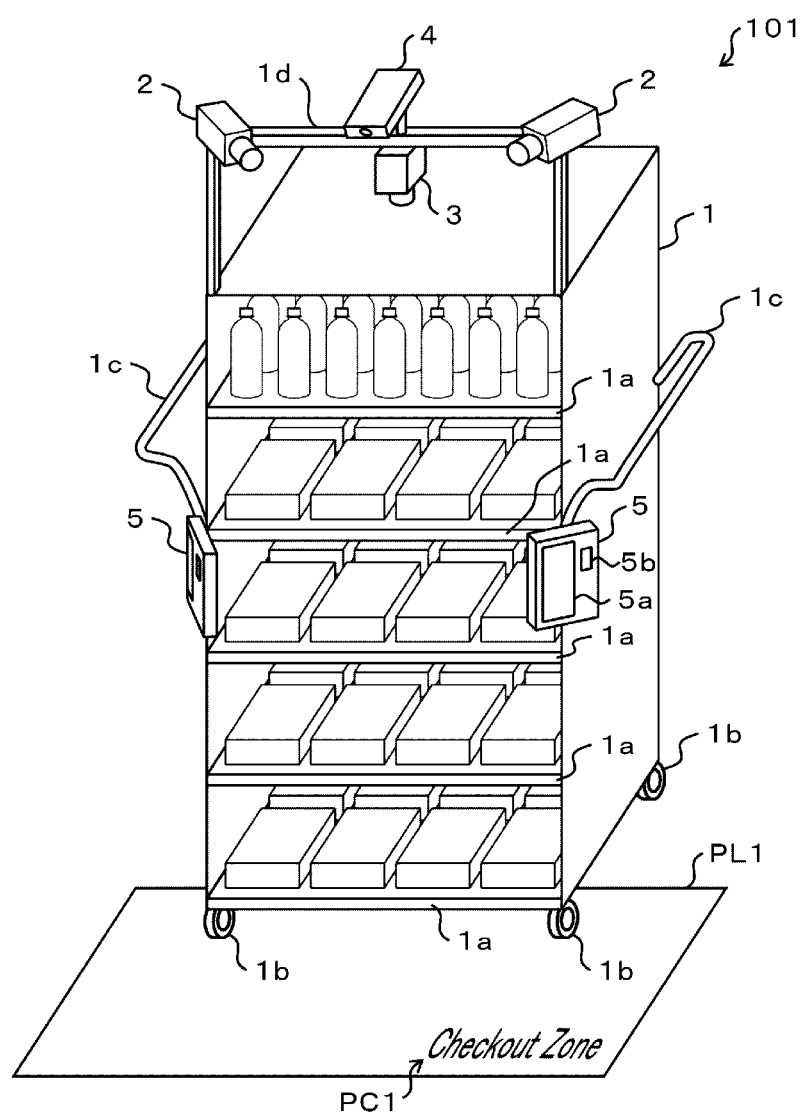
FIG. 1 schematically illustrates a perspective view of a display rack according to an embodiment.

FIG. 1 schematically illustrates a perspective view of a display rack 101 according to an embodiment.

A constituent of the display rack 101 is a shelf 1. The shelf 1 is formed in a hollow rectangular parallelepiped opened on one surface. The shelf 1 includes a plurality of shelf plates 1a, a plurality of casters 1b, a plurality of handles 1c, and a supporting member 1d.

The shelf plates 1a are attached within an internal space of the shelf 1. The number and the positions of the shelf plates 1a are not particularly limited. However, in FIG. 1, as an example, the number of the shelf plates 1a is five. Commodities (items for sale) are displayed on the shelf plates 1a as illustrated in FIG. 1. Accordingly, the shelf 1 is an example of a display section for displaying commodities.

The casters 1b are attached to the bottom of the shelf 1. The display rack 101 can be easily moved on a floor by the casters 1b.

The handles 1c are respectively attached to two sidewall outer surfaces orthogonal to an opening surface of the shelf 1. The handles 1c are gripped by an operator if the display rack 101 is moved. The number and the positions of the handles 1c are not particularly limited. The handles 1c may be absent.

The supporting member 1d is attached to a top plate outer surface of the shelf 1 in a state in which the supporting member 1d projects upward. The supporting member 1d supports two tracking cameras 2, a monitoring camera 3, and a projector 4.

The two tracking cameras 2 photograph a person present in a photographing area including a purchase area, a detection area, a preliminary area, and a confirmation area. The two tracking cameras 2 may respectively photograph the photographing area or only one tracking camera 2 may photograph an area in a part of the photographing area. Only one of the tracking cameras 2 may be provided or other one or a plurality of tracking cameras 2 may be additionally provided. The positions of the tracking cameras 2 are also not particularly limited. Images photographed by the tracking cameras 2 are used to track the person. The tracking is explained below. As the tracking cameras 2, well-known camera devices such as an optical camera, an infrared camera, a TOF (time of flight) camera, and a stereo camera can be used. As the tracking cameras 2, a camera device suitable for measuring a distance to an object such as a TOF camera or a stereo camera is preferable.

The monitoring camera 3 photographs the opening surface of the shelf 1 and a space further on the outer side of the shelf 1 than the opening surface. An image photographed by the monitoring camera 3 is used to monitor an action of the person extending a hand to the inside of the shelf 1. The monitoring is explained below. As the monitoring camera 3, well-known camera devices such as an optical camera, an infrared camera, a TOF camera, and a stereo camera can be used. As the monitoring camera 3, a camera device suitable for measuring a distance to an object such as a TOF camera or a stereo camera is preferable.

The projector 4 projects any applicable image onto a floor surface. A line PL1 and characters PC1 illustrated in FIG. 1 are included in the image projected by the projector 4. The projector 4 can be omitted on the premise that measures for, for example, laying a mat having size equivalent to a range represented by the line PL1 are taken.

User interface units (hereinafter referred to as UI units) 5 are respectively attached to both side ends of the opening surface of the shelf 1. The UI unit 5 includes a touch panel 5a and a reader 5b and performs a user interface operation. The touch panel 5a and the reader 5b are explained below. If it is necessary to distinguish two UI units 5 in the following explanation, the UI unit 5 illustrated on the left side in FIG. 1 is referred to as "first UI unit 5" and the other UI unit 5 is referred to as "second UI unit 5".

Figure 2:
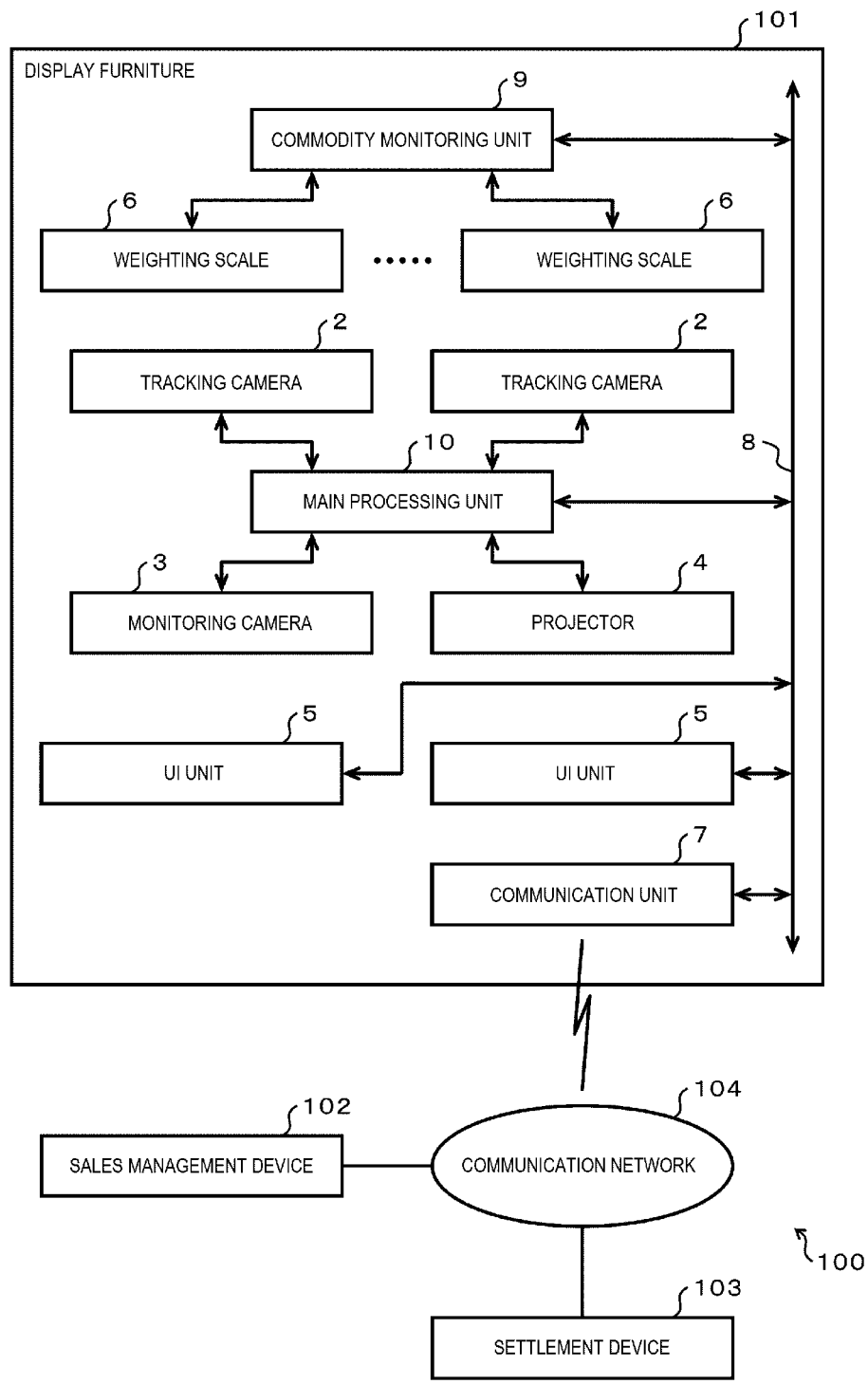
FIG. 2 is a block diagram illustrating a circuit configuration of the display rack and a schematic configuration of a transaction processing system.

FIG. 2 is a block diagram illustrating a circuit configuration of the display rack 101 and a schematic configuration of a transaction processing system 100. In FIG. 2, the same components as the components illustrated in FIG. 1 are denoted by the same reference numerals and signs.

The display rack 101, a sales management device 102, and a settlement device 103 are communicably connected via a communication network 104 to configure the transaction processing system 100.

The sales management device 102 is an information processing device that performs information processing for managing sales of commodities displayed on the display rack 101. The settlement device 103 is an information processing device that performs information processing for settlement concerning the sales of the commodities displayed on the display rack 101. As the communication network 104, for example, the Internet, a VPN (virtual private network), a LAN (local area network), a public communication network, a mobile communication network, and the like can be used alone or can be used in combination as appropriate. As an example, the display rack 101, the sales management device 102, and the settlement device 103 are provided in one store. In this case, as the communication network 104, typically, an intra-store LAN is used.

The display rack 101 includes a plurality of weighting scales 6, a communication unit 7, an intra-rack communication path 8, a commodity monitoring unit 9, and a main processing unit 10 in addition to the tracking cameras 2, the monitoring camera 3, the projector 4, and the UI unit 5 illustrated in FIG. 1 as well.

The tracking cameras 2, the monitoring camera 3, and the projector 4 are connected to the main processing unit 10. The UI unit 5 is connected to the intra-rack communication path 8.

The plurality of weighting scales 6 are provided in the shelf plates 1a and measure the weights of the commodities displayed on the shelf plates 1a. One weighting scale 6 may be provided in one shelf plate 1a. A plurality of weighting scales 6 may be provided in one shelf plate 1a. The weighting scales 6 output measurement data representing the measured weights to the commodity monitoring unit 9.

The communication unit 7 performs wireless communication for data exchange via the communication network 104. If the communication network 104 is a LAN, as the communication unit 7, for example, a well-known communication device conforming to the IEEE802.11 standard can be used. However, as the communication unit 7, a communication device that performs wired communication may be used.

The intra-rack communication path 8 enables the UI unit 5, the communication unit 7, the commodity monitoring unit 9, and the main processing unit 10 to exchange data. As the intra-rack communication path 8, for example, a LAN is used.

The commodity monitoring unit 9 is an information processing unit that performs, based on measurement data given from the weighting scales 6, information processing for monitoring a display state of the commodities in the shelf 1.

The main processing unit 10 is an information processing unit that operates to specify, based on images photographed by the tracking cameras 2 and the monitoring camera 3, a person taking a commodity from the shelf 1 and performs information processing for causing the person to settle a price of the commodity.

Figure 3:
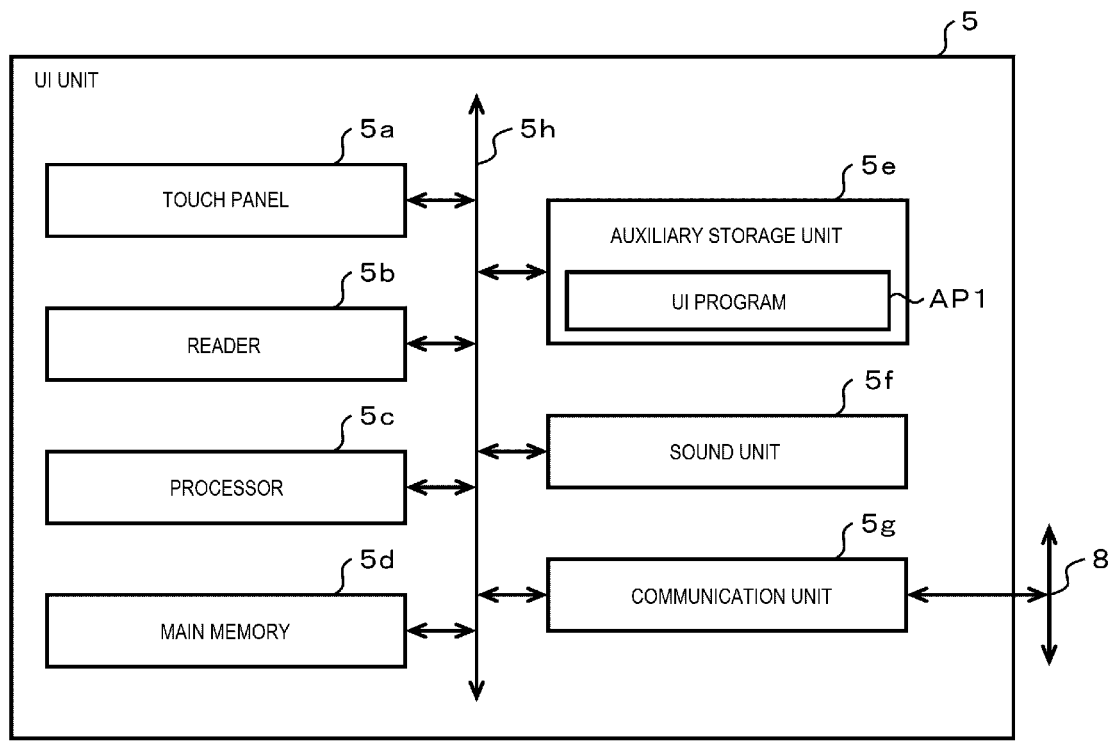
FIG. 3 is a block diagram illustrating a circuit configuration of a user interface unit.

FIG. 3 is a block diagram illustrating a circuit configuration of the UI unit 5. In FIG. 3, the same components as the components illustrated in FIGS. 1 and 2 are denoted by the same reference numerals and signs.

The UI unit 5 includes a processor 5c, a main memory 5d, an auxiliary storage unit 5e, a sound unit 5f, a communication unit 5g, and a transmission path 5h in addition to the touch panel 5a and the reader 5b illustrated in FIG. 1.

The processor 5c, the touch panel 5a, the reader 5b, the main memory 5d, the auxiliary storage unit 5e, the sound unit 5f, and the communication unit 5g are communicably connected via the transmission path 5h.

The touch panel 5a is a display device that displays various screens such as an operation screen. The touch panel 5a is an operation device that receives operation corresponding to the operation screen.

The reader 5b reads a member ID (identifier) from a medium carried by a customer. The member ID may be referred to as a customer ID. As the reader 5b, a well-known data reading device that reads a visible code such as a barcode or a two-dimensional code displayed on a card surface or the display device can be used. As the reader 5b, a well-known data reading device of another type such as a well-known magnetic card reader, a well-known IC (integrated circuit) card reader, or a well-known noncontact card reader can also be used. As the reader 5b, reading devices of a plurality of types may be provided.

The processor 5c, the main memory 5d, and the auxiliary storage unit 5e are connected by the transmission path 5h, whereby a computer for controlling the UI Unit 5 is configured.

The processor 5c is equivalent to a central part of the computer. The processor 5c executes, according to an operating system and information processing programs such as application programs, information processing for realizing various functions of the UI unit 5. The processor 5c is, for example, a CPU (central processing unit).

The main memory 5d is equivalent to a main storage part of the computer. The main memory 5d includes a nonvolatile memory region and a volatile memory region. The main memory 5d stores the information processing programs in the nonvolatile memory region. The main memory 5d may store, in the nonvolatile or volatile memory region, data necessary for the processor 5c to execute the information processing. The main memory 5d uses the volatile memory region as a work area where data is rewritten as appropriate by the processor 5c. The nonvolatile memory region is, for example, a ROM (read only memory). The volatile memory region is, for example, a RAM (random access memory).

The auxiliary storage unit 5e is equivalent to an auxiliary storage part of the computer. As the auxiliary storage unit 5e, a storage unit including a well-known storage device such as an EEPROM (electric erasable programmable read-only memory), a HDD (hard disc drive), or an SSD (solid state drive) can be used. The auxiliary storage unit 5e saves data used by the processor 5c in performing various kinds of processing, data created by the processing in the processor 5c, or the like. The auxiliary storage unit 5e may store the information processing programs.

The sound unit 5f outputs various sounds such as voice and melody.

The communication unit 5g is an interface of data communication via the intra-rack communication path 8. As the communication unit 5g, for example, a well-known communication device for performing data communication via a LAN can be used.

The transmission path 5h includes an address bus, a data bus, and a control signal line and transmits data and control signals exchanged among the sections connected by the transmission path 5h.

The auxiliary storage unit 5e stores a UI program AP1, which is one of the information processing programs. The UI program AP1 is an application program and is described about information processing for causing the UI unit 5 to function as a user interface of the display rack 101.

Figure 4:
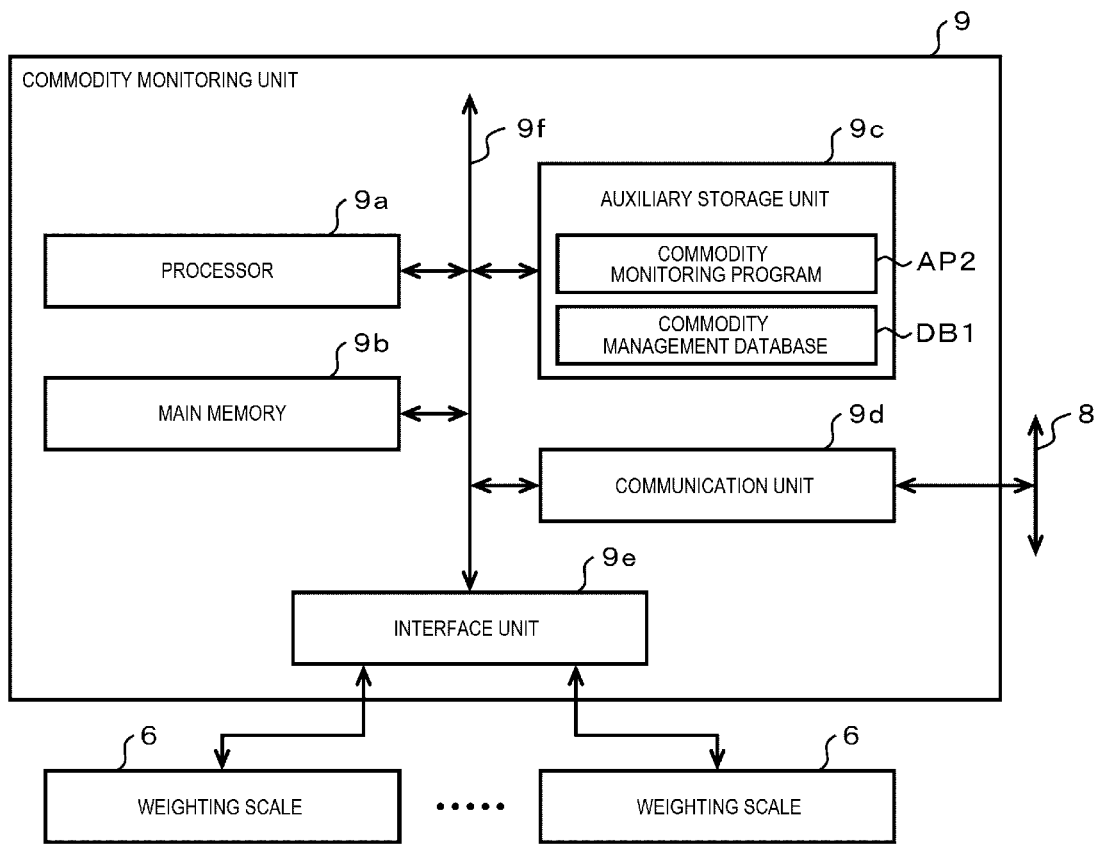
FIG. 4 is a block diagram illustrating a circuit configuration of a commodity monitoring unit.

FIG. 4 is a block diagram illustrating a circuit configuration of the commodity monitoring unit 9. In FIG. 4, the same components as the components illustrated in FIGS. 1 and 2 are denoted by the same reference numerals and signs.

The commodity monitoring unit 9 includes a processor 9a, a main memory 9b, an auxiliary storage unit 9c, a communication unit 9d, an interface unit 9e, and a transmission path 9f.

The processor 9a, the main memory 9b, the auxiliary storage unit 9c, the communication unit 9d, and the interface 9e are communicably connected via the transmission path 9f. The processor 9a, the main memory 9b, and the auxiliary storage unit 9c are connected by the transmission path 9f, whereby a computer for controlling the commodity monitoring unit 9 is configured.

The processor 9a is equivalent to a central part of the computer. The processor 9a executes, according to an operating system and information processing programs such as application programs, information processing for realizing various functions of the commodity monitoring unit 9. The processor 9a is, for example, a CPU.

The main memory 9b is equivalent to a main storage part of the computer. The main memory 9b includes a nonvolatile memory region and a volatile memory region. The main memory 9b stores the information processing programs in the nonvolatile memory region. The main memory 9b may store, in the nonvolatile or volatile memory region, data necessary for the processor 9a to execute information processing. The main memory 9b uses the volatile memory region as a work area where data is rewritten as appropriate by the processor 9a. The nonvolatile memory region is, for example, a ROM. The volatile memory region is, for example, a RAM.

The auxiliary storage unit 9c is equivalent to an auxiliary storage part of the computer. As the auxiliary storage unit 9c, a storage unit including a well-known storage device such as an EEPROM, a HDD, or an SSD can be used. The auxiliary storage unit 9c saves data used by the processor 9a in performing various kinds of processing, data created by the processing in the processor 9a, or the like. The auxiliary storage unit 9c may store the information processing programs.

The communication unit 9d is an interface of data communication via the intra-rack communication path 8. As the communication unit 9d, for example, a well-known communication device for performing data communication via a LAN can be used.

The plurality of weighting scales 6 are connected to the interface unit 9e. The interface unit 9e interfaces exchange of data between the processor 9a and the weighting scales 6. As the interface unit 9e, well-known devices such as various interface boards including a USB (universal serial bus) board can be used. A plurality of interface units 9e may be provided.

The transmission path 9f includes an address bus, a data bus, and a control signal line and transmits data and control signals exchanged among the sections connected by the transmission path 9f.

The auxiliary storage unit 9c stores a commodity monitoring program AP2, which is one of the information processing programs. The commodity monitoring program AP2 is an application program and is described about information processing explained below for realizing a function of the commodity monitoring unit 9. A part of a storage region of the auxiliary storage unit 9c is used as a storage region of a commodity management database DB1. The commodity management database DB1 is a database for managing the commodities displayed on the display rack 101.

Figure 5:
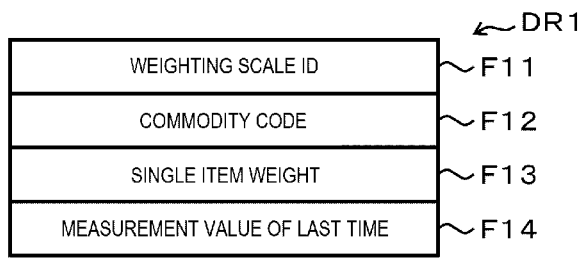
FIG. 5 schematically illustrates a configuration of a data record included in a commodity management database.

FIG. 5 illustrates a configuration of a data record DR1 included in the commodity management database DB1.

The commodity management database DB1 is a set of a plurality of data records DR1 respectively correlated with the plurality of weighting scales 6. The data record DR1 includes fields F11, F12, F13, and F14. In the field F11, a weighting scale ID for distinguishing the weighting scale 6 correlated with the field F11 from the other weighting scales 6 is set. In the field F12, a commodity code for distinguishing a commodity placed on the weighting scale 6 correlated with the field F12 from the other commodities is set. The commodity code is an identification code decided to identify a commodity for each of SKUs (stock keeping units). For example, a JAN (Japanese article number) code is used. In the field F13, weight of a single item of the commodity identified by the commodity code set in the field F12 is set. In the field F14, a measurement value of the last time by the weighting scale 6 correlated with the field F14 is set. The data record DR1 may include a field in which any data different from the data explained above is set.

Figure 6:
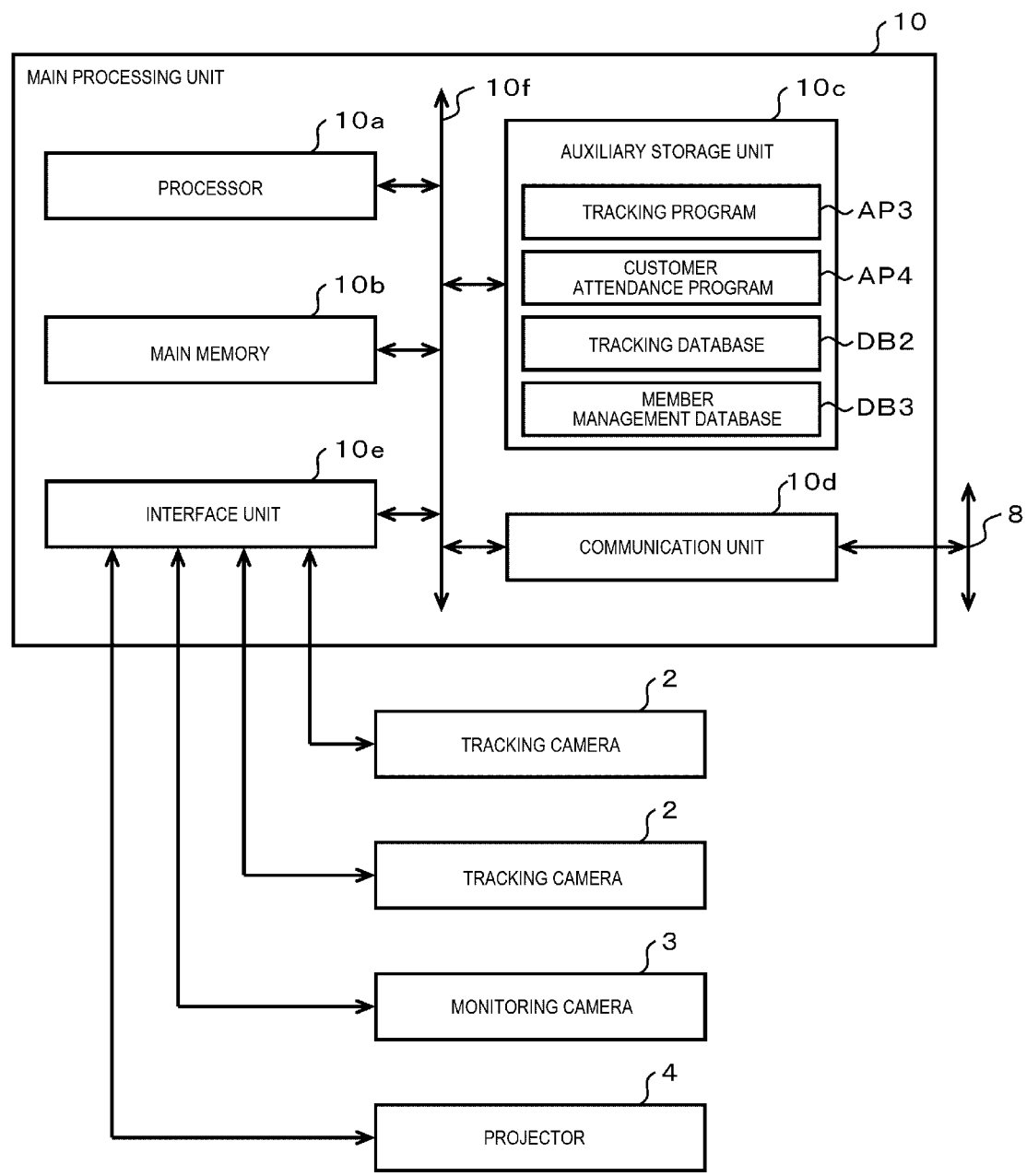
FIG. 6 is a block diagram illustrating a circuit configuration of a main processing unit.

FIG. 6 is a block diagram illustrating a circuit configuration of the main processing unit 10. In FIG. 6, the same components as the components illustrated in FIGS. 1 and 2 are denoted by the same reference numerals and signs.

The main processing unit 10 includes a processor 10a, a main memory 10b, an auxiliary storage unit 10c, a communication unit 10d, an interface unit 10e, and a transmission path 10f.

The processor 10a, the main memory 10b, the auxiliary storage unit 10c, the communication unit 10d, and the interface unit 10e are communicably connected via the transmission path 10f. The processor 10a, the main memory 10b, and the auxiliary storage unit 10c are connected by the transmission path 10f, whereby computer for controlling the main processing unit 10 is configured.

The processor 10a is equivalent to a central part of the computer. The processor 10a executes, according to an operating system and information processing programs such as application programs, information processing for realizing various functions of the main processing unit 10. The processor 10a is, for example, a CPU.

The main memory 10b is equivalent to a main storage part of the computer. The main memory 10b includes a nonvolatile memory region and a volatile memory region. The main memory 10b stores the information processing programs in the nonvolatile memory region. The main memory 10b may store, in the nonvolatile or volatile memory region, data necessary for the processor 10a to execute information processing. The main memory 10b uses the volatile memory region as a work area where data is rewritten as appropriate by the processor 10a. The nonvolatile memory region is, for example, a ROM. The volatile memory region is, for example, a RAM.

The auxiliary storage unit 10c is equivalent to an auxiliary storage part of the computer. As the auxiliary storage unit 10c, a storage unit including a well-known storage device such as an EEPROM, a HDD, or an SSD can be used. The auxiliary storage unit 10c saves data used by the processor 10a in performing various kinds of processing, data created by the processing in the processor 10a, or the like. The auxiliary storage unit 10c may store the information processing programs.

The communication unit 10d is an interface of data communication via the intra-rack communication path 8. As the communication unit 10d, for example, a well-known communication device for performing data communication via a LAN can be used.

The two tracking cameras 2, the monitoring camera 3, and the projector 4 are respectively connected to the interface unit 10e. The interface unit 10e interfaces exchange of data between the processor 10a and the tracking cameras 2, the monitoring camera 3, and the projector 4. As the interface unit 10e, well-known devices such as various interface boards including a USB board can be used. A plurality of interface units 10e may be provided.

The transmission path 10f includes an address bus, a data bus, and a control signal line and transmits data and control signals exchanged among the sections connected by the transmission path 10f.

The auxiliary storage unit 10c stores a tracking program AP3 and a customer attendance program AP4, each of which is one of the information processing programs. The tracking program AP3 is an application program and is described about information processing explained below for tracking of a person. The customer attendance program AP4 is an application program and is described about information processing explained below for customer attendance. A part of a storage region of the auxiliary storage unit 10c is used as storage regions of a tracking database DB2 and a member management database DB3. The tracking database DB2 is a database for managing data for tracking a person set as a tracking target. The member management database DB3 is a database for managing a member being tracked.

Figure 7:
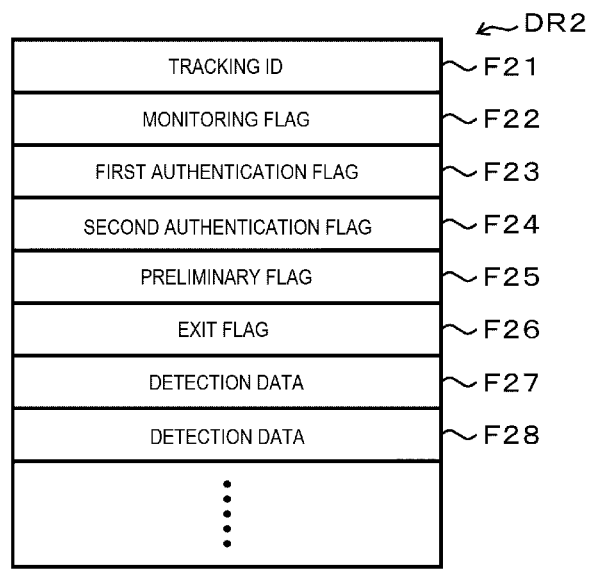
FIG. 7 illustrates a configuration of a data record included in a tracking database.

FIG. 7 illustrates a configuration of a data record DR2 included in the tracking database DB2.

The tracking database DB2 is a set of data records DR2 respectively correlated with persons set as tracking targets. The data record DR2 includes fields F21, F22, F23, F24, F25, F26, and F27. The data record DR2 may include a field F28 and subsequent fields. In the field F21, a tracking ID allocated to distinguish a person correlated with the field F21 from other persons is set. The tracking ID is temporarily allocated to a person set as a tracking target and is not data for specifying an individual. In the field F22, a monitoring flag indicating whether a person correlated with the field F22 is set as a target of action monitoring is set. In this embodiment, if the monitoring flag is in an ON state, the monitoring flag indicates that the person is set as the target of the action monitoring. In the field F23, a first authentication flag indicating whether a person correlated with the field F23 is located in an authentication area corresponding to the first UI unit 5 is set. In the field F24, a second authentication flag indicating whether a person correlated with the field F24 is located in an authentication area corresponding to the second UI unit 5 is set. In this embodiment, if the first authentication flag and the second authentication flag are in the ON state, the first authentication flag and the second authentication flag indicate that the persons are located in the authentication areas. In the field F25, a preliminary flag indicating whether a person correlated with the field F25 is located in a preliminary area explained below is set. In this embodiment, if the preliminary flag is in the ON state, the preliminary flag indicates that the person is located in the preliminary area. In the field F26, an exit flag indicating whether a person correlated with the field F26 exits a tracking area explained below is set. In this embodiment, if the exit flag is in the ON state, the exit flag indicates that the person exits. In the field F27, detection data representing a result of one position detection concerning a person correlated with the field F27 is set. According to movement of the correlated person, fields in which detection data representing results of position detection after the movement is set are sequentially added after the field F28. The data record DR2 may include a field in which any data different from the data explained above is set.

Figure 8:
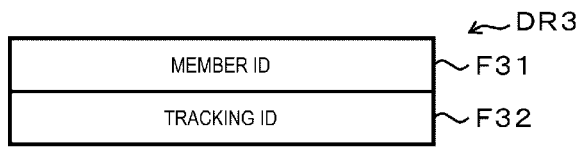
FIG. 8 illustrates a configuration of a data record included in a member management database.

FIG. 8 illustrates a configuration of a data record DR3 included in the member management database DB3.

The member management database DB3 is a set of data records DR3 respectively correlated with persons who are set as tracking targets and finish member authentication. Accordingly, the number of data records DR3 included in the member management database DB3 fluctuates according to the number of persons corresponding to the data records DR3. A situation in which the member management database DB3 does not include the data record DR3 at all could occur. The data record DR3 includes fields F31 and F32. In the field F31, a member ID given to a person correlated with the field F31 is set. In the field F32, a tracking ID for tracking a person correlated with the field F32 is set. The data record DR3 may include a field in which any data different from the data explained above is set.

As hardware of the commodity monitoring unit 9 or the main processing unit 10, for example, a general-purpose information processing device can be used. In general, transfer of the commodity monitoring unit 9 or the main processing unit 10 is performed in a state in which the commodity monitoring program AP2 or the tracking program AP3 and the customer attendance program AP4 are respectively stored and the commodity management database DB1 or the tracking database DB2 and the member management database DB3 are not stored in the auxiliary storage unit 9c or the auxiliary storage unit 10c. However, the hardware in a state in which the commodity monitoring program AP2 or the tracking program AP3 and the customer attendance program AP4 are not stored in the auxiliary storage unit 9c or the auxiliary storage unit 10c or a state in which an application program of the same type and a different version is stored in the auxiliary storage unit 9c or the auxiliary storage unit 10c and the commodity monitoring program AP2 or the tracking program AP3 and the customer attendance program AP4 may be separately transferred. The commodity monitoring program AP2 or the tracking program AP3 and the customer attendance program AP4 are written in the auxiliary storage unit 9c or the auxiliary storage unit 10c according to operation by any operator, whereby the commodity monitoring unit 9 or the main processing unit 10 may be configured. Transfer of the commodity monitoring program AP2 or the tracking program AP3 and the customer attendance program AP4 stored in the auxiliary storage unit 9c or the auxiliary storage unit 10c can be performed by being recorded in a removable recording medium such as a magnetic disk, a magneto-optical disk, an optical disk, or a semiconductor memory or by communication via a network. The processor 9a or 10a executes information processing based on the commodity monitoring program AP2 or the tracking program AP3 and the customer attendance program AP4, whereby the commodity management database DB1 or the tracking database DB2 and the member management database DB3 are configured in the auxiliary storage unit 9c or the auxiliary storage unit 10c. At least one of the commodity monitoring program AP2 and the commodity management database DB1 may be stored in the main memory 9b. At least a part of the tracking program AP3, the customer attendance program AP4, the tracking database DB2, and the member management database DB3 may be stored in the main memory 10b.

The operation of the transaction processing system 100 configured as explained above is explained. Content of processing explained below is an example. A change of order of a part of processing, omission of a part of the processing, addition of other processing, or the like can be performed as appropriate.

As a use of the display rack 101, in a usual sales store, in a time period with many customers such as a lunch time, the display rack 101 is temporarily set in a store front or the like in a state in which top selling commodities and the like in the time period and the displayed commodities are sold in an unmanned manner. Accordingly, the display rack 101 includes the casters 1b and the handles 1c and can be easily moved by a store clerk or the like. However, the display rack 101 may be set in any place such as the inside of a building of a company or may be permanently set. Uses of the display rack 101 are not limited to the examples explained above. If the display rack 101 is permanently set, the casters 1b and the handles 1c may be omitted. Electric components included in the display rack 101 may operate with power supply from a commercial power supply or the like using a power supply cable or may operate with power supply from a battery mounted on the display rack 101.

If a plurality of commodities are displayed in a measurement area by one weighting scale 6 on the shelf plate 1a, a rule concerning use of the display rack 101 is that the plurality of commodities are commodities identified by the same commodity code. An administrator such as a store clerk designates, with predetermined operation in the UI unit 5, which commodity is displayed in which measurement area. For example, the processor 5c causes the touch panel 5a to display a GUI (graphical user interface) screen for selecting a measurement area and receives designation of a measurement area by a touch on the GUI screen. The processor 5c causes the reader 5b to read a commodity barcode held over the reader 5b by the administrator. It is assumed that the processor 5c is designated that a commodity identified by a commodity code represented by the commodity barcode read by the reader 5b is displayed in the designated measurement area. In response to this designation, in the UI unit 5, the processor 5c finds out, from the commodity management database DB1, the data record DR1 in which a weighting scale ID of the weighting scale 6 corresponding to the designated measurement area is set in the field F11 and sets a commodity code of the designated commodity in the field F12 of the data record DR1. At this time, for example, the administrator puts a specified number of pieces of the commodity in the measurement area. For example, the processor 5c acquires a measurement value of the weighting scale 6 corresponding to the measurement area and divides the measurement value by the specified number to calculate a single item weight. The processor 5c sets the calculated single item weight in the field F13 of the data record DR1 in which the commodity code is set. The processor 5c may set the acquired measurement value or may provisionally set a predetermined value such as zero in the field F14 of the data record DR1.

The commodity management database DB1 only has to coincide with a display state of commodities on the shelf plates 1a. A method of updating the commodity management database DB1 may be not particularly limited. For example, the processor 5c may update the commodity management database DB1 according to an instruction from any information processing device on the outside. The processor 5c may access the sales management device 102 or any other server device via the communication unit 5g, the intra-rack communication path 8, and the communication network 104 and acquire a single item weight correlated with the commodity code.

If the display rack 101 in in an operation state for performing customer attendance, in the main processing unit 10, the processor 10a executes information processing conforming to the tracking program AP3 (hereinafter referred to as tracking processing).

The tracking processing is mainly processing for specifying a present position in a tracking area of a person set as a tracking target (hereinafter referred to as tracked person) and determining in which area among several areas decided in the tracking area relatively to the display rack 101 the position is present. Prior to explanation of the tracking processing, areas decided in the tracking area are explained.

Figure 9:
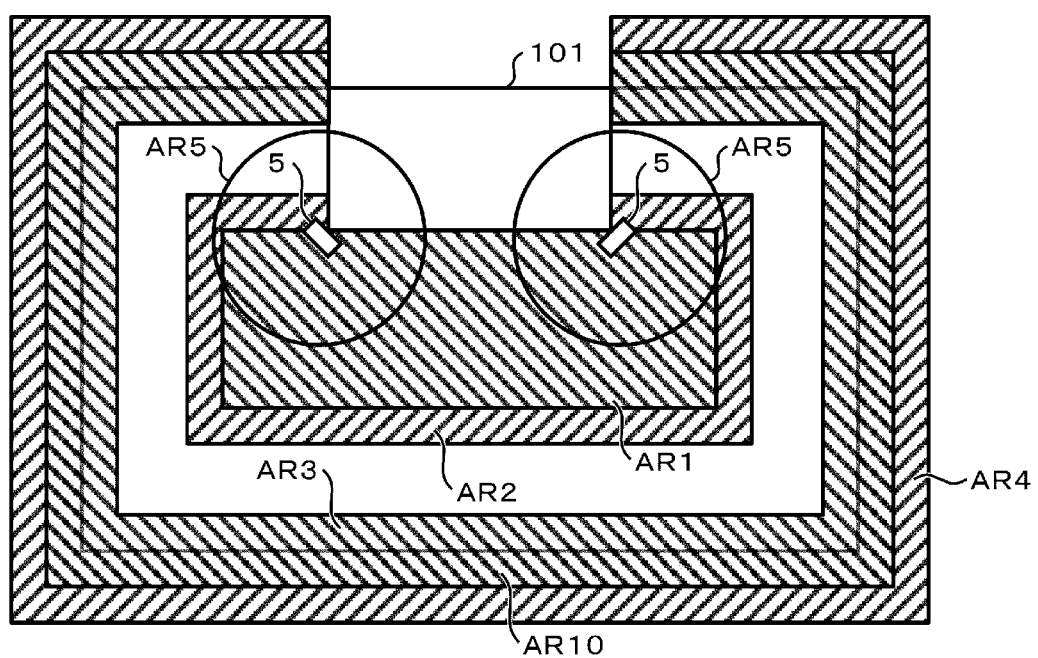
FIG. 9 illustrates a plan view of sub-areas in a tracking area.

FIG. 9 illustrates a plan view of sub-areas in the tracking area.

As illustrated in FIG. 9, a purchase area AR1, a detection area AR2, a preliminary area AR3, a decision area AR4, and two authentication arears AR5 are respectively decided as sub-areas based on the position of the display rack 101. A rectangular area including the entire region of the decision area AR4 is the tracking area. Which areas are specifically set as the areas may be optionally decided by, for example, a creator of the tracking program AP3. That is, sizes of the respective areas, ratios of sizes among the plurality of areas, and the like may be changed from the state illustrated in FIG. 9. The sizes of the areas may be changeable according to an instruction by any operator such as a maintenance operator or a store administrator. Consequently, it is possible to adjust the areas considering the structure and the like of a setting place of the display rack 101.

The purchase area AR1 is an area where a customer about to take out a commodity from the display rack 101 should be located. The projector 4 projects an image such that a line PL1 illustrated in FIG. 1 generally coincides with the outer edge of the purchase area AR1. If the size of the purchase area AR1 is changeable as explained above, the projector 4 enables projection magnification of an image to be changed. The projector 4 changes the projection magnification according to operation by the maintenance operator, the store administrator, or the like or according to, for example, an instruction from the processor 10a of the main processing unit 10. For example, a rule in use of a service provided by the transaction processing system 100 is that a customer stays in the purchase area AR1 while taking, from the shelf 1, all commodities that the customer is about to purchase.

The detection area AR2 is an area where a tracked person is detected anew. The detection area AR2 is decided as, for example, an area where a person entering the purchase area AR1 passes. That is, the detection area AR2 is, for example, a belt-like area around the purchase area AR1. The detection area AR2 may partially overlap the purchase area AR1.

The preliminary area AR3 and the decision area AR4 are areas for determining that a tracked person exits the tracking area. Both of the preliminary area AR3 and the decision area AR4 are decided as areas where a person leaving the purchase area AR1 passes. The preliminary area AR3 is closer to the purchase area AR1 than the decision area AR4. In an example illustrated in FIG. 9, a part of the preliminary area AR3 and a part of the decision area AR4 overlap each other. An overlapping area AR10 is an area where the preliminary area AR3 and the decision area AR4 overlap. The preliminary area AR3 and the decision area AR4 may be in contact with each other without overlapping. The preliminary area AR3 is separated from the decision area AR4. However, a part of the decision area AR4 and a part of the preliminary area AR3 may overlap each other. The decision area AR4 and the preliminary area AR3 may be in contact with each other without overlapping.

The two authentication areas AR5 respectively correspond to two UI units 5 as explained above. In the following explanation, if it is necessary to distinguish the two authentication areas AR5, the authentication area AR5 corresponding to the first UI unit 5 is referred to as first authentication area AR5 and the authentication area AR5 corresponding to the second UI unit 5 is referred to as second authentication area AR5. In the example illustrated in FIG. 9, a circular area centering on the UI unit 5 corresponding thereto is set as the authentication area AR5.

Photographing directions and visual field sizes of the two tracking cameras 2 are set such that the two tracking cameras 2 respectively photograph a photographing area including at least the tracking area or share the photographing. The processor 10a executes, separately from tracking processing explained below, information processing (hereinafter referred to as detection processing) for determining a present position of a person based on images photographed by the tracking cameras 2. For example, the processor 10a attempts, based on the images photographed by the tracking cameras 2, detection of a person photographed in the image. If succeeding in detecting the person, the processor 10a determines the position of the person. As processing for determining the position of the person photographed in the image from the image, well-known various kinds of processing can be used as appropriate. If a camera device including a distance measuring function such as a TOF camera or a stereo camera is used as the tracking cameras 2, the processor 10a may determine the present position of the person taking into account a measurement result by the function. The processor 10a periodically executes the detection processing at a predetermined interval.

Figure 10:
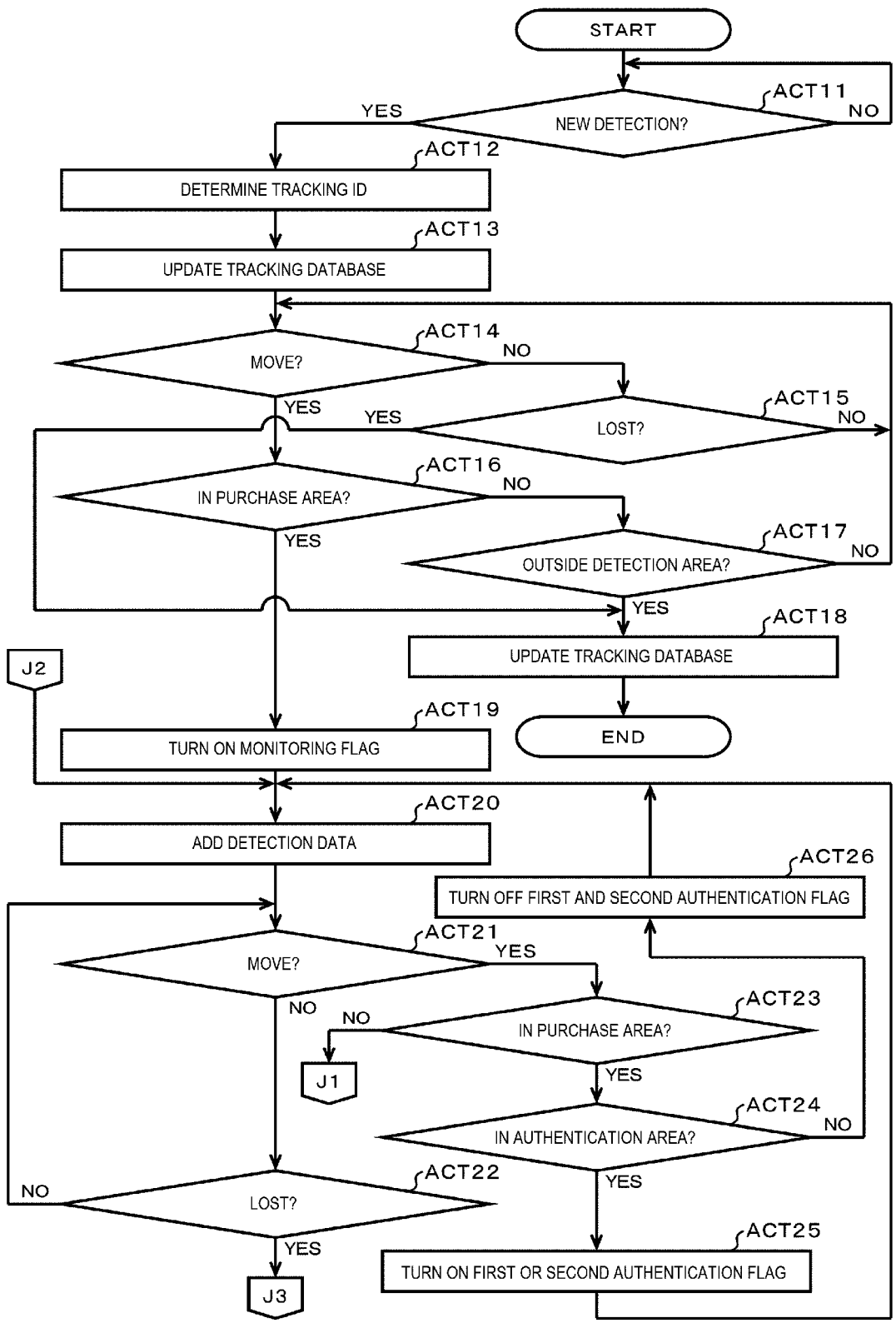
FIG. 10 is a flowchart of a tracking processing.
Figure 11:
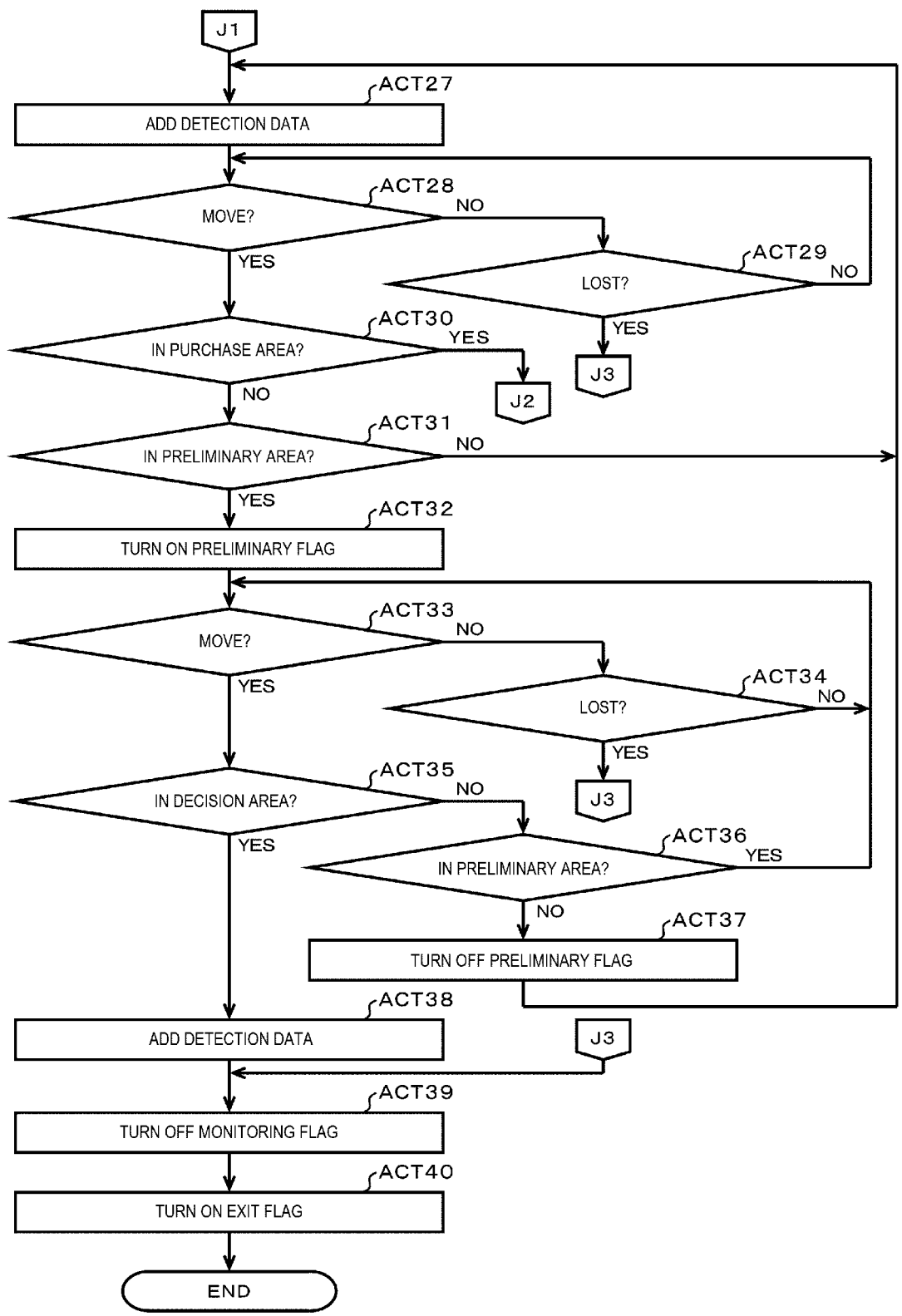
FIG. 11 is a flowchart of a tracking processing.

FIGS. 10 and 11 are flowcharts of tracking processing.

In ACT 11 in FIG. 10, the processor 10a waits for a person set as a target of tracking to be detected anew. For example, if a person detected as being located in a detection area by the detection processing is not set as a tracking target, the processor 10a determines YES and the process proceeds to ACT 12. If the process proceeds to ACT 12 in this way, the processor 10a starts the tracking processing in another thread while continuing the tracking processing. That is, in a situation in which a plurality of persons set as targets of tracking are present, the processor 10a executes the tracking processing in parallel for the respective persons. If the person detected as being located in the detection area by the detection processing is not a tracked person in other tracking processing, the processor 10a determines that the person is not set as a tracking target.

In ACT 12, the processor 10a determines, for the person detected anew, a tracking ID not to overlap tracking IDs of other tracked persons.

In ACT 13, the processor 10a updates the tracking database DB2 in order to manage the person detected anew as a tracked person. For example, the processor 10a adds a new data record DR2 to the tracking database DB2. The processor 10a sets the tracking ID determined in ACT 12 in the field F21 of the new data record DR2. The processor 10a turns off all of flags of the fields F22 to F26 of the new data record DR2. The processor 10a sets, in the field F27 of the new data record DR2, detection data representing a present position and a present date and time determined by the detection processing about the person detected anew. The processor 10a does not include the field F28 and subsequent fields in the new data record DR2.

Consequently, the person detected anew is set as a tracked person. As explained above, a plurality of kinds of tracking processing may be executed in parallel. A plurality of tracked persons for the display rack 101 could be present. However, in the following explanation, simple description of "tracked person" indicates a tracked person set as a target of tracking processing being explained.

In ACT 14, the processor 10a determines whether the tracked person moves. If the movement of the tracked person cannot be determined, the processor 10a determines NO and the process proceeds to ACT 15.

In ACT 15, the processor 10a determines whether the tracked person is lost track of. If the tracking of the tracked person is continued, the processor 10a determines NO and the process returns to ACT 14.

In this way, in ACT 14 and ACT 15, the processor 10a waits for the tracked person to move or to be lost track of.

For example, every time a result of the detection processing is obtained anew, the processor 10a operates to specify, based on the present positions of persons detected anew and positions represented by detection data set in the data record DR2 correlated with the tracked person, the tracked person out of the persons detected anew. The processor 10a determines, from a relation between the present position of the tracked person and a position represented by detection data set at the end of the data record DR2 correlated with the tracked person, whether the tracked person moves. For example, if a separation distance between the two positions is equal to or larger than a predetermined threshold, the processor 10a determines that the tracked person moves. If the tracked person moves, the processor 10a determines YES in ACT 14 and the process proceeds to ACT 16.

In ACT 16, the processor 10a determines whether the present position of the tracked person is the inside of the purchase area AR1. If the present position of the tracked person is the outside of the purchase area AR1, the processor 10a determines NO and the process proceeds to ACT 17.

In ACT 17, the processor 10*a* determines whether the present position of the tracked person is the outside of the detection area AR2. If the present position of the tracked person is the inside of the detection area AR2, the processor 10*a* determines NO and the process returns to ACT 14.

In this way, in ACTS 14 to 17, the processor 10*a* waits for the tracked person to move to the inside of the purchase area AR1 or move in the opposite direction of the purchase area AR1 and exit the detection area AR2.

If the tracked person exits the detection area AR2 without entering the purchase area AR1, the processor 10*a* determines YES in ACT 17 and the process proceeds to ACT 18.

Incidentally, for example, if the data record DR2 correlated with the tracked person in the tracking database DB2 is not updated for a predetermined period, the processor 10*a* determines that tracking loss occurs. If the tracking loss occurs in the waiting state in ACT 14 and ACT 15, the processor 10*a* determines YES in ACT 15 and the process directly proceeds to ACT 18.

In ACT 18, the processor 10*a* updates the tracking database DB2 to exclude the tracked person from tracked persons. For example, the processor 10*a* deletes, from the tracking database DB2, the data record DR2 in which the tracking ID of the tracked person is set in the field F21. Consequently, the processor 10*a* ends the tracking processing.

A person about to purchase a commodity displayed on the display rack 101 passes the detection area AR2 and advances to the purchase area AR1. If the tracked person moves in that way, the processor 10*a* determines YES in ACT 16 and the process proceeds to ACT 19.

In ACT 19, the processor 10*a* turns on the monitoring flag set in the field F22 of the data record DR2 in which the tracking ID of the tracked person is set in the field F21.

In ACT 20, the processor 10*a* adds, to the end of the data record DR2 in which the tracking ID of the tracked person is set in the field F21, a field in which new detection data is set. The processor 10*a* sets the new detection data as data representing the present position and the present time of the tracked person determined in the latest detection processing. In this way, the detection data is added according to the movement of the tracked person, whereby a moving track of the tracked person is recorded.

In ACT 21, the processor 10*a* determines whether the tracked person moves. If the movement of the tracked person cannot be determined, the processor 10*a* determines NO and the process proceeds to ACT 22.

In ACT 22, the processor 10*a* determines whether the tracked person is lost track of. If the tracking of the tracked person is continued, the processor 10*a* determines NO and the process returns to ACT 21.

In this way, in ACT 21 and ACT 22, the processor 10*a* waits for the tracked person to move or to be lost track of. If it is determined, as in ACT 14, that the tracked person moves, the processor 10*a* determined YES in ACT 21 and the process proceeds to ACT 23.

In ACT 23, the processor 10*a* determines whether the present position of the tracked person is the inside of the purchase area AR1. If the present position of the tracked person is the inside of the purchase area AR1, the processor 10*a* determines YES and the process proceeds to ACT 24.

In ACT 24, the processor 10*a* determines whether the present position of the tracked person is the inside of the first or second authentication area AR5. If the present position of the tracked person is the inside of the first or second authentication area AR5, the processor 10*a* determines YES and the process proceeds to ACT 25. That is, if the tracked person is located in an area where the purchase area AR1 and the first or second authentication area AR5 overlap, the process proceeds to ACT 25.

In ACT 25, if the tracked person is located in the first authentication area, the processor 10*a* turns on the first authentication flag. If the tracked person is located in the second authentication area, the processor 10*a* turns on the second authentication flag. Thereafter, the process returns to ACT 20. The processor 10*a* adds detection data concerning a position after the movement of the tracked person and thereafter returns to the waiting state in ACT 21.

If the present position of the tracked person is the inside of the purchase area AR1 but is the outside of the first or second authentication area AR5, the processor 10*a* determines NO in ACT 24 and the process proceeds to ACT 26.

In ACT 26, the processor 10*a* turns off both of the first authentication flag and the second authentication flag. Thereafter, the process returns to ACT 20, adds detection data concerning a position after the movement of the tracked person, and thereafter returns to the waiting state in ACT 21.

If the tracked person exits the purchase area AR1, in ACT 23, the processor 10*a* determines NO and the process proceeds to ACT 27.

In ACT 27, as in ACT 20, the processor 10*a* adds a field in which the detection data is set. That is, in order to record the movement of the tracked person, the processor 10*a* adds new detection data to the data record DR2 correlated with the tracked person.

In ACT 28, the processor 10*a* determines whether the tracked person moves. If the movement of the tracked person cannot be determined, the processor 10*a* determines NO and the process proceeds to ACT 29.

In ACT 29, the processor 10*a* determines whether the tracked person is lost track of. If the tracking of the tracked person is continued, the processor 10*a* determines NO and the process returns to ACT 28.

In this way, in ACT 28 and ACT 29, the processor 10*a* waits for the tracked person to move or to be lost track of. If determining the movement of the tracked person as in ACT 14, the processor 10*a* determines YES in ACT 28 and the process proceeds to ACT 30.

In ACT 30, the processor 10*a* determines whether the present position of the tracked person is the inside of the purchase area AR1. If the present position of the tracked person is the inside of the purchase area AR1, the processor 10*a* determines YES and the process returns to ACT 20 in FIG. 10. That is, if the tracked person returns to the inside of the purchase area AR1, the processor 10*a* adds new detection data in order to record the movement of the tracked person and thereafter shifts to the waiting state in ACT 21 and ACT 22.

If the tracked person does not return to the purchase area AR1, the processor 10*a* determines NO in ACT 30 in FIG. 11 and the process proceeds to ACT 31.

In ACT 31, the processor 10*a* determines whether the present position of the tracked person is the inside of the preliminary area AR3. If the present position of the tracked person is the outside of the preliminary area AR3, the processor 10*a* determines NO and the process returns to ACT 27. That is, the processor 10*a* adds new detection data in order to record the movement of the tracked person and thereafter returns to the waiting state in ACT 28 and ACT 29.

If the tracked person exits the purchase area AR1 and moves to the inside of the preliminary area AR3 without returning to the purchase area AR1, the processor 10*a* determines YES in ACT 31 and the process proceeds to ACT 32.

In ACT 32, the processor 10a turns on the preliminary flag set in the field F25 of the data record DR2 in which the tracking ID of the tracked person is set in the field F21.

In ACT 33, the processor 10a determines whether the tracked person moves. If the movement of the tracked person cannot be determined, the processor 10a determines NO and the process proceeds to ACT 34.

In ACT 34, the processor 10a determines whether the tracked person is lost track of. If the tracking of the tracked person is continued, the processor 10a determines NO and the process returns to ACT 33.

In this way, in ACT 33 and ACT 34, the processor 10a waits for the tracked person to move or to be lost track of. If determining that the tracked person moves as in ACT 14, the processor 10a determines YES in ACT 33 and the process proceeds to ACT 35.

In ACT 35, the processor 10a determines whether the present position of the tracked person is the inside of the decision area AR4. If the present position of the tracked person is the outside of the decision area AR4, the processor 10a determines NO and the process proceeds to ACT 36.

In ACT 36, the processor 10a determines whether the present position of the tracked person is the inside of the preliminary area AR3. If the present position of the tracked person is the inside of the preliminary area AR3, the processor 10a determines YES and the process returns to ACT 33.

In this way, in ACT 33 to ACT 36, the processor 10a waits for the tracked person to move to the inside of the decision area AR4, to move in the opposite direction of the decision area AR4 and exit the preliminary area AR3, or to be lost track of.

If the tracked person exits the preliminary area AR3 without entering the decision area AR4, the processor 10a determines NO in ACT 36 and the process proceeds to ACT 37.

In ACT 37, the processor 10a turns off the preliminary flag set in the field F25 of the data record DR2 in which the tracking ID of the tracked person is set in the field F21. Thereafter, the process returns to ACT 27, that is, the processor 10a adds new detection data in order to record the movement of the tracked person and thereafter shifts to the waiting state in ACT 28 and ACT 29.

If the tracked person passes the preliminary area AR3 and advances to the decision area AR4 in order to leave the display rack 101, the processor 10a determines YES in ACT 35 and the process proceeds to ACT 38.

In ACT 38, as in ACT 20, the processor 10a adds a field in which the detection data is set. That is, in order to record the movement of the tracked person, the processor 10a adds new detection data to the data record DR2 correlated with the tracked person. Thereafter, the process proceeds to ACT 39.

If determining that the tracked person is lost track of in any one of the waiting state in ACT 21 and ACT 22 in FIG. 10, the waiting state in ACT 28 and ACT 29 in FIG. 11, and the waiting state in ACT 33 and ACT 34 in FIG. 11, the processor 10a determines YES in ACT 22, ACT 29, or ACT 34 and the process proceeds to ACT 39 in FIG. 11.

In ACT 39, the processor 10a turns off the monitoring flag set in the field F22 of the data record DR2 in which the tracking ID of the tracked person is set in the field F21.

In ACT 40, the processor 10a turns on the exit flag set in the field F26 of the data record DR2 in which the tracking ID of the tracked person is set in the field F21. The processor 10a ends the tracking processing.

The processor 10a executes the tracking processing as explained above. Consequently, it is possible to determine, based on the tracking database DB2, in which area each of the tracked persons is located and a moving track. The processor 10a detects, based on a result of such tracking, that the tracked person leaves the shelf 1 functioning as the display section. The processor 10a executes the information processing based on the tracking program AP3 in this way, whereby the computer including the processor 10a as the central part functions as a tracking section and a leaving detecting section.

On the other hand, if the display rack 101 is in the operation state for performing customer attendance, the processor 9a in the commodity monitoring unit 9 executes information processing conforming to the commodity monitoring program AP2 (hereinafter referred to as monitoring processing). The monitoring processing is information processing for monitoring movement of the commodities displayed on the display rack 101.

Figure 12:
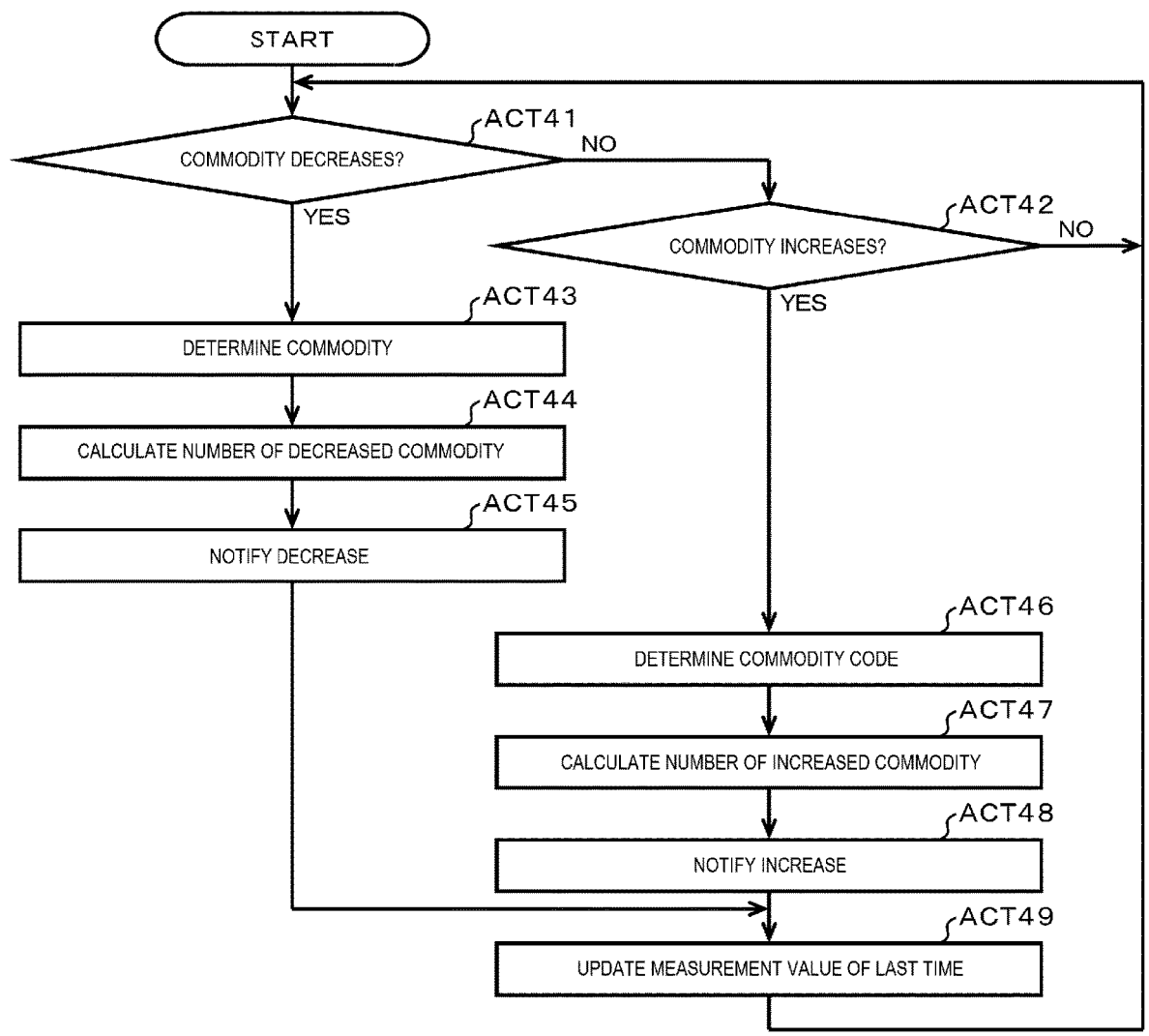
FIG. 12 is flowchart of a monitoring processing.

FIG. 12 is a flowchart of the monitoring processing.

In ACT 41, the processor 9a determines whether the commodities displayed on the display rack 101 decrease. If a relevant event cannot be determined, the processor 9a determines NO and the process proceeds to ACT 42.

In ACT 42, the processor 9a determines whether the commodities displayed on the display rack 101 increase. If a relevant event cannot be determined, the processor 9a determines NO and the process returns to ACT 41.

In this way, in ACT 41 and ACT 42, the processor 9a waits for the commodities to decrease or increase.

For example, if a customer takes out a commodity displayed on the display rack 101 from the display rack 101 or if a commodity displayed on the display rack 101 drops from the display rack 101, the commodities displayed on the display rack 101 decrease. In this case, a measurement value in the weighting scale 6 in a measurement area where the commodity is placed decreases. If a commodity once moved from the display rack 101 is returned to the display rack 101, the commodities displayed on the display rack 101 increase. In this case, a measurement value in the weighting scale 6 in a measurement area where the commodity is placed increases.

If a measurement value of any one of the weighting scales 6 decreases, the processor 9a determines YES in ACT 41 and the process proceeds to ACT 43. For example, if a measurement value acquired from the weighting scale 6 is smaller than a measurement value of the last time set in the field F14 of the data record DR1 correlated with the same weighting scale 6 in the commodity management database DB1 and a difference value between the measurement values is equal to or larger than a specified value, the processor 9a determines that the measurement value of the weighting scale 6 decreases.

In ACT 43, the processor 9a determines a decreased commodity. For example, the processor 9a finds out, from the commodity management database DB1, the data record DR1 in which a weighting scale ID of the weighting scale 6 that measures the decreased measurement value as explained above is set in the field F11. The processor 9a determines the decreased commodity as a commodity identified by a commodity code set in the field F12 of the data record DR1.

In ACT 44, the processor 9a calculates the number of pieces of the decreased commodity. For example, the processor 9a sets, as the number of pieces of the decreased commodity, an integer value obtained by applying predetermined rounding to a value calculated by dividing the difference value calculated in ACT 43 by the single item weight set in the field F13 of the data record DR1 correlated with the same weighting scale 6 in the commodity management database DB1.

In ACT 45, the processor 9a notifies the decrease of the commodity to the main processing unit 10. For example, the processor 9a sends notification data for notifying the decrease of the commodity to the intra-rack communication path 8 to be transmitted from the communication unit 9d to the main processing unit 10. The processor 9a includes, in the notification data, identification data for identifying the notification of the decrease, a commodity code of the decreased commodity, and the number of pieces of the decreased commodity.

In this way, the processor 9a detects, based on the change of the measurement value by the weighting scale 6, the movement of the commodity from the shelf 1 functioning as the display section. Therefore, the processor 9a executes the information processing based on the commodity monitoring program AP2, whereby the computer including the processor 9a as the central part functions as a movement detecting section.

On the other hand, if a measurement value of any one of the weighting scales 6 increases, the processor 9a determines YES in ACT 42 and the process proceeds to ACT 46. For example, if the measurement value acquired from the weighting scale 6 is larger than the measurement value of the last time set in the field F14 of the data record DR1 correlated with the same weighting scale 6 in the commodity management database DB1 and the difference value between the measurement values is equal to or larger than the specified value, the processor 9a determines that the measurement value of the weighting scale 6 increases.

In ACT 46, the processor 9a determines an increased commodity. For example, the processor 9a finds out, from the commodity management database DB1, the data record DR1 in which a weighting scale ID of the weighting scale 6 that measures the increased measurement value as explained above is set in the field F11. The processor 9a determines the increased commodity as a commodity identified by a commodity code set in the field F12 of the data record DR1.

In ACT 47, the processor 9a calculates the number of pieces of the increased commodity. For example, the processor 9a sets, as the number of pieces of the increased commodity, an integer value obtained by applying predetermined rounding to a value calculated by dividing the difference value calculated in ACT 43 by the single item weight set in the field F13 of the data record DR1 correlated with the same weighting scale 6 in the commodity management database DB1.

In ACT 48, the processor 9a notifies the increase of the commodity to the main processing unit 10. For example, the processor 9a sends notification data for notifying the increase of the commodity to the intra-rack communication path 8 to be transmitted from the communication unit 9d to the main processing unit 10. The processor 9a includes, in the notification data, identification data for identifying the notification of the increase, a commodity code of the increased commodity, and the number of pieces of the increased commodity.

If finishing the notification in ACT 45 or ACT 48, the process proceeds to ACT 49.

In ACT 49, the processor 9a updates the measurement value of the last time set in the field F14 of the data record DR1 correlated with the weighting scale 6 in the commodity management database DB1, the measurement value of which changes, in the commodity management database DB1 to the measurement value after the change. Thereafter, the processor 9a returns to the waiting state in ACT 41 and ACT 42.

If the display rack 101 is in the operation state for performing customer attendance, in the main processing unit 10, the processor 10a executes information processing conforming to the customer attendance program AP4 (hereinafter referred to as customer attendance processing) separately from the detection processing and the tracking processing explained above.

Figure 13:
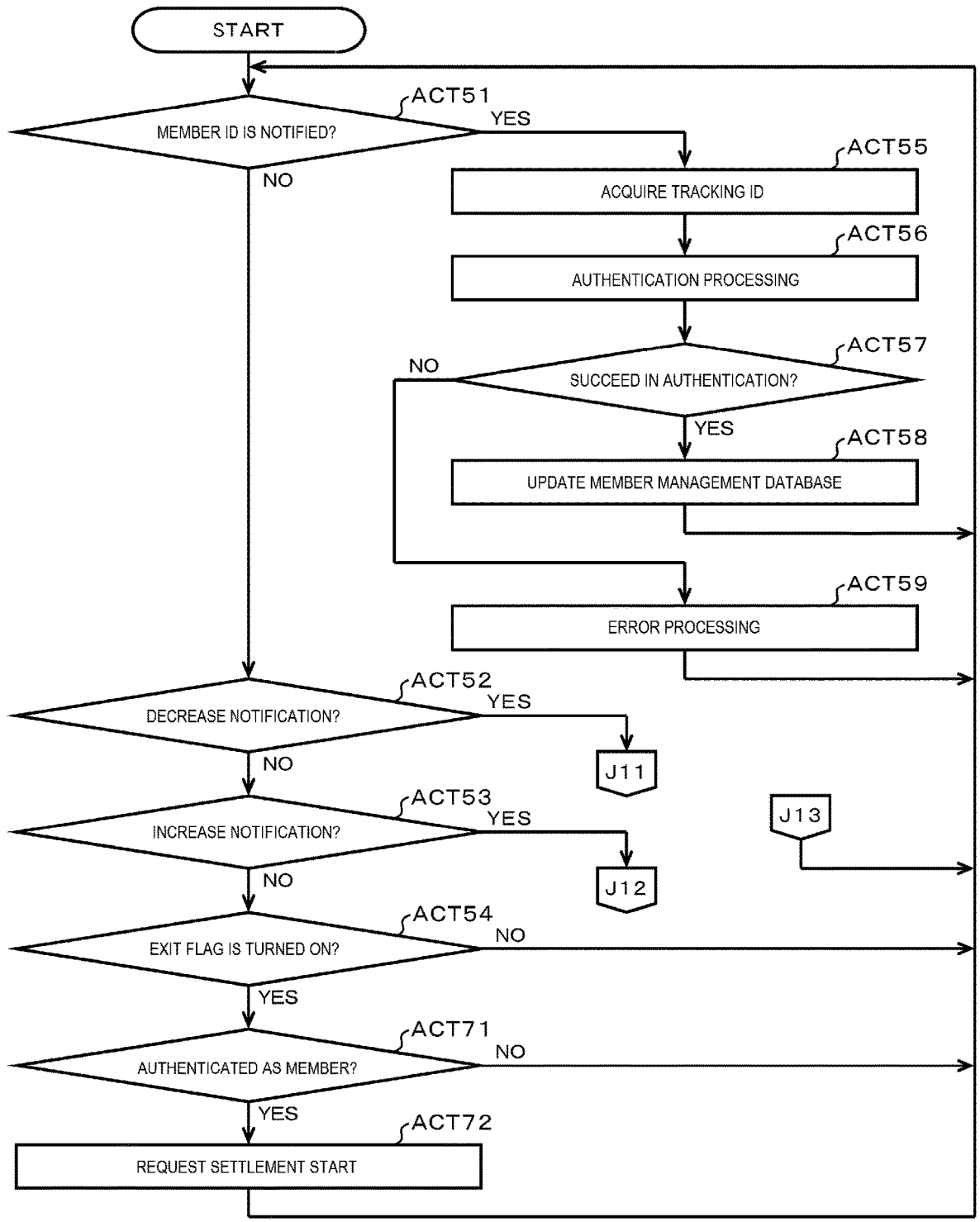
FIG. 13 is a flowchart of a customer attendance processing.
Figure 14:
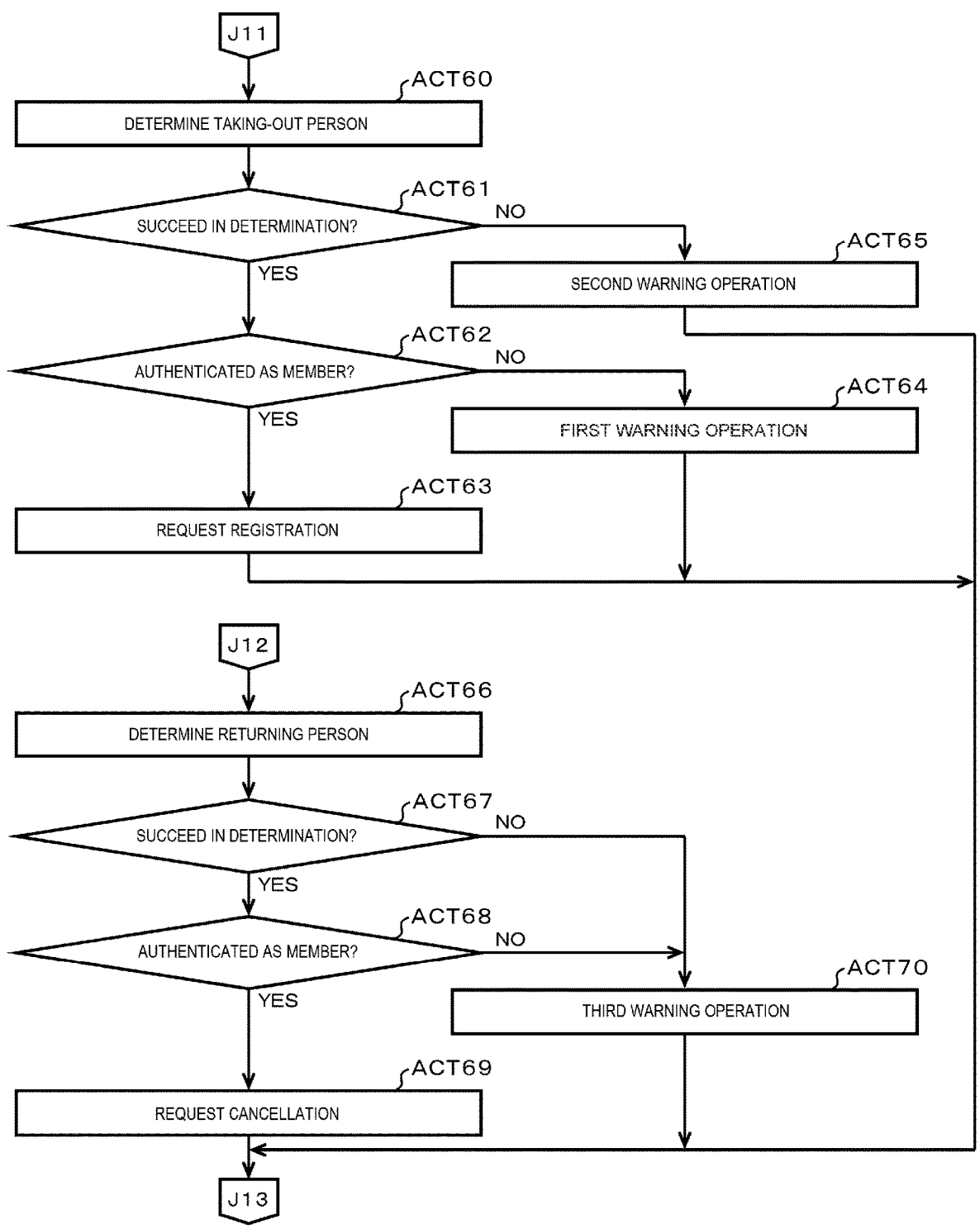
FIG. 14 is a flowchart of a customer attendance processing.

FIGS. 13 and 14 are flowcharts of the customer attendance processing.

In ACT 51 in FIG. 13, the processor 10a determines whether a member ID is notified. If the notification cannot be determined, the processor 10a determines NO and the process proceeds to ACT 52.

In ACT 52, the processor 10a determines whether a decrease notification is performed. If the notification cannot be determined, the processor 10a determines NO and the process proceeds to ACT 53.

In ACT 53, the processor 10a determines whether an increase notification is performed. If the notification cannot be determined, the processor 10a determines NO and the process proceeds to ACT 54.

In ACT 54, the processor 10a determines whether the exit flag is turned on. If a relevant event cannot be determined, the processor 10a determines NO and the process returns to ACT 51.

In this way, in ACT 51 to ACT 54, the processor 10a waits for the member ID, the decrease, or the increase to be notified or the exist flag to be turned on.

To a customer registered as a member, a member ID for distinguishing the customer from other customers is given. The customer registered as a member can register settlement information for settlement in a settlement method not involving transfer of cash. Various kinds of personal information about the customer registered as a member, the member ID, and the settlement information are managed by the sales management device 102 or the settlement device 103 or managed by another member server.

If desiring to perform, using registered settlement information, settlement concerning purchase of a commodity displayed on the display rack 101, the customer registered as a member causes the UI unit 5 to read the member ID. For example, the customer causes a display device of a portable information terminal carried by the customer to display a barcode representing the member ID and causes the reader 5b of the UI unit 5 to read the barcode. A reading method for the member ID in the UI unit 5 may be any other method.

In the UI unit 5, if the member ID is read by the reader 5b, the processor 5c notifies the member ID to the main processing unit 10 with information processing based on the UI program AP1. For example, the processor 5c sends notification data including the identification data for identifying the notification of the member ID and the member ID to the intra-rack communication path 8 to be transmitted from the communication unit 5g to the main processing unit 10.

For example, if a customer is enforced to cause the UI unit 5 to read the member ID in a state in which the customer faces the UI unit 5 and the size of the authentication area AR5 is appropriately decided, the same authentication flag is not on about a plurality of tracked persons if the member ID is read by the UI unit 5. However, the processor 5c may specify, for example, based on an image photographed by the monitoring camera 3 or an image photographed by a TOF camera or the like, a tracked person who performs an action of causing the UI unit 5 to read the member ID and may notify a tracking ID of the tracked person.

In the main processing unit 10, if the notification data for notification of the member ID is received by the communication unit 10*d*, the processor 10*a* determines YES in ACT 51 and the process proceeds to ACT 55.

In ACT 55, the processor 10*a* acquires a tracking ID of a tracked person equivalent to the customer whose notified member ID is read by the UI unit 5. For example, if the member ID is notified from the first UI unit 5, the processor 10*a* finds out, from the tracking database DB2, the data record DR2 in which the first authentication flag is in the ON state. If the member ID is notified from the second UI unit 5, the processor 10*a* finds out, from the tracking database DB2, the data record DR2 in which the second authentication flag is in the ON state. The processor 10*a* acquires a tracking ID set in the field F21 of the data record DR2. If a plurality of data records DR2 in which the authentication flag corresponding to the UI unit 5 that notifies the member ID is in the ON state are found, the processor 10*a* selects one data record DR2 according to a predetermined rule. For example, the processor 10*a* selects the data record DR2 in which a position represented by detection data set in an end field is closer to the center of the authentication area.

In ACT 56, the processor 10*a* performs authentication processing about the notified member ID. For example, the processor 10*a* inquires a device that monitors various kinds of personal information, a member ID, and settlement information about the customer registered as a member and determines that the notified member ID is a regular member ID given to the member.

In ACT 57, the processor 10*a* determines whether the processor 10*a* succeeds in the authentication. If succeeding in the authentication, the processor 10*a* determines YES and the process proceeds to ACT 58.

In ACT 58, the processor 10*a* updates the member management database DB3 to include the data record DR3 for management of the member whose member ID is read by the UI unit 5. That is, for example, the processor 10*a* sets the notified member ID in the field F31 and adds, to the member management database DB3, new data record DR3 in which the tracking ID acquired in ACT 55 is set in the field F32. Thereafter, the processor 10*a* returns to the waiting state in ACT 51 to ACT 54.

In this way, the processor 10*a* identifies the tracked person as the member identified by the notified member ID. The member is specified as an individual through the member registration. That is, the processor 10*a* identifies the tracked person as an individual.

If failing in the authentication in ACT 56, the processor 10*a* determines NO in ACT 57 and the process proceeds to ACT 59.

In ACT 59, the processor 10*a* executes error processing. The error processing is processing for notifying the customer that the processor 10*a* fails in authentication. For example, the processor 10*a* instructs the UI unit 5, which reads the member ID, to display a predetermined error screen for notifying the customer that the processor 10*a* fails in the authentication. Alternatively, for example, the processor 10*a* instructs the portable information terminal, which displays the barcode representing the member ID, to display the error screen. Thereafter, the processor 10*a* returns to the waiting state in ACT 51 to ACT 54.

If the notification data for the decrease notification is received by the communication unit 10*d*, the processor 10*a* determines YES in ACT 52 and the process proceeds to ACT 60 in FIG. 14.

In ACT 60, the processor 10*a* determines a taking-out person who took out the decreased commodity from the display rack 101. For example, the processor 10*a* extracts, from the tracking database DB2, all the data records DR2 in which the monitoring flags set in the fields F22 are on and sets, as candidates of the taking-out person, all tracked persons identified by tracking IDs set in the fields F21 of the relevant data records DR2. If taking a commodity from the display rack 101, the customer extends an arm to the commodity and retracts the arm after gripping the commodity. For example, the processor 10*a* operates to specify, based on an image photographed by the monitoring camera 3, a tracked person who performs the action among the tracked persons set as the candidates of the taking-out person and determines the tracked person as the taking-out person.

More specifically, for example, by analyzing changes of a plurality of images photographed by the monitoring camera 3 in a monitoring period determined in advance considering a period in which the action for taking a commodity is performed, the processor 10*a* operates to specify the person who performs the action. Then, the processor 10*a* determines the position of the person. The processor 10*a* selects, out of the extracted data records DR2, the data record DR2 in which a position indicated by detection data set in an end field is closest to the specified position. If a separation distance between the position indicated by the detection data set in the end field of the data record DR2 and the specified position is shorter than a specified distance, the processor 10*a* determines, as the taking-out person, a tracked person identified by the tracking ID set in the field F21 of the data record DR2. If a relevant tracked person is not found, the processor 10*a* determines that the taking-out person is unknown. The processor 10*a* may measure the length of an arm of the taking-out person based on a relation between the position indicated by the detection data set in the end field in the selected data record DR2 and a display position of the decreased commodity and the image photographed by the monitoring camera 3 and, if the length is larger than a specified length, determine that the taking-out person is unknown.

In most cases, if the tracked person retracts the arm, movement of a commodity occurs and a change occurs in a measurement value of the weighting scale 6. However, because of, for example, vibration of the shelf plates 1*a*, a slight time is required until the measurement value of the weighting scale 6 stabilizes. Therefore, a time lag occurs for the weighting scale 6 to output a new measurement value. As such, once the processor 10*a* finally receives the decrease notification, most of the actions by the taking-out person taking the commodity may have already ended. That is, the monitoring period needs to begin before the processor 10*a* receives the decrease notification. Therefore, for example, the processor 10*a* buffers images photographed by the monitoring camera 3 in the auxiliary storage unit 10*c* or the like for a fixed period to account for the time lag associated with the output from the weighting scale 5. After receiving the decrease notification, the processor 10*a* analyzes images concerning the monitoring period from among the buffered images. Alternatively, the processor 10*a* may execute the processing in ACT 60 as processing of a thread different from the customer attendance processing.

In this way, the processor 10*a* executes the information processing based on the customer attendance program AP4, whereby the computer including the processor 10*a* as the central part monitors an action of a person in the purchase area AR1. The computer functions as a monitoring section.

In ACT 61, the processor 10*a* determines whether the processor 10*a* succeeds in determining the taking-out person. If succeeding in determining the taking-out person, the processor 10*a* determines YES and the process proceeds to ACT 62.

In ACT 62, the processor 10*a* determines whether the tracked person determined as the taking-out person is already authenticated as a member. The processor 10*a* finds, from the member management database DB3, the data record DR3 in which the same tracking ID as the tracking ID set in the field F21 of the data record DR2 selected in ACT 60 is set in the field F32. If the data record DR3 is found, the processor 10*a* determines YES and the process proceeds to the ACT 63.

In ACT 63, the processor 10*a* requests the sales management device 102 to register the commodity as a purchased commodity. For example, the processor 10*a* sends request data for the request to the intra-rack communication path 8 to be transmitted from the communication unit 10*d* to the sales management device 102. Then, the request data is relayed by the communication unit 7 and transmitted to the sales management device 102 via the communication network 104. The processor 10*a* includes, in the request data, identification data for identifying the registration request, a commodity code of the purchased commodity, the number of purchased pieces, and the member ID. The processor 10*a* directly includes, in the request data, as the commodity code of the purchased commodity, the commodity code included in the received notification data explained above. The processor 10*a* directly includes, in the request data, as the number of purchased pieces, the number of pieces of the decreased commodity included in the received notification data explained above. The processor 10*a* includes, in the request data, the member ID set in the field F31 of the data record DR3 found in ACT 62.

In this way, the processor 10*a* determines, based on the monitoring result by the function of the monitoring section of the processor 10*a* and the detection result by the function of the movement detecting section of the processor 9*a*, as a transaction commodity concerning the tracked person, the commodity moved from the shelf 1 functioning as the display section. Therefore, the processor 10*a* executes the information processing based on the customer attendance program AP4, whereby the computer including the processor 10*a* as the central part functions as a determining section.

If receiving the request data, the sales management device 102 performs registration processing for registering a commodity identified by the commodity code included in the request data as a purchased commodity of the member identified by the member ID included in the request data by the number of purchased pieces included in the request data. The registration processing may be the same processing as the processing performed in a transaction processing device such as an existing POS terminal. In this way, the sales management device 102 has a function of a managing section.

If determining in ACT 62 that the tracked person is not authenticated as a member yet, the processor 10*a* determines NO and the process proceeds to ACT 64. For example, if the data record DR3 in which the same tracking ID as the tracking ID set in the field F21 of the data record DR2 selected in ACT 60 is set in the field F32 cannot be found from the member management database DB3, the processor 10*a* determines that the tracked person is not authenticated as a member yet.

In ACT 64, the processor 10*a* performs a first warning operation. The first warning operation is for urging the taking-out person to perform settlement of the commodity that has been taken from the display rack 101. As the first warning operation, for example, the processor 10*a* instructs the UI unit 5 to display a predetermined screen. As the first warning operation, for example, the processor 10*a* instructs the UI unit 5 to output a predetermined voice message. As the first warning operation, the processor 10*a* may perform any operation different from these operations or may perform a plurality of kinds of operations. Contents of the screen, the voice message, or the like may be decided as appropriate according to circumstances of the store in which the display rack 101 is set. In the case of a store in which a checkout corner where a store clerk stays or a checkout corner of a self-service type is provided, for example, the contents of the screen, the voice message, or the like are contents for urging the taking-out person to perform settlement in the checkout corner. In the case of a store that limits purchase of commodities displayed on the display rack 101 to only members, for example, the contents of the screen, the voice message, or the like are contents for urging the taking-out person to return commodities to a store clerk. According to the first warning operation, if a customer who does not understand a service provided by the transaction processing system 100 takes out a commodity from the shelf 1, it is possible to cause the customer to appropriately perform actions thereafter.

If a customer other than a member is allowed to perform settlement of a commodity displayed on the display rack 101 in the checkout corner where a store clerk stays or the self-service type checkout corner, even if the tracked person not finishing member authentication takes out a commodity from the shelf 1, this does not correspond to an abnormal state. Therefore, the first warning operation in this case is not warning for the abnormal state. In the case of a store that limits purchase of commodities displayed on the display rack 101 to only members, if the tracked person not finishing member authentication takes out a commodity from the shelf 1, this corresponds to the abnormal state. Therefore, the first warning operation in this case is equivalent to the warning for the abnormal state.

If failing in determining the taking-out person in ACT 60, the processor 10*a* determines NO in ACT 61 and the process proceeds to ACT 65. This case occurs if the processor 10*a* determines in ACT 60 that the taking-out person is unknown as explained above. This case also occurs if a person not tracked by the tracking processing because of some obstacle takes out a commodity or if a commodity drops from the shelf plate 1*a*.

In ACT 65, the processor 10*a* performs a second warning operation. The second warning operation may be the same operation as the first warning operation. However, contents in the second warning operation are differentiated from the contents in the first warning operation. For example, the contents in the second warning operation are, for example, contents for urging the taking-out person or a person present around the taking-out person to consult a store clerk. Alternatively, the second warning operation may be an instruction of screen display or voice message output to a terminal device used by the store clerk. The contents in the second warning operation in this case are, for example, contents for urging the store clerk to determine a situation and take measures. Since a customer does not know whether the customer is correctly tracked by the tracking processing, the customer is not responsible for an abnormal state that occurs because the customer takes out a commodity from the shelf 1. The customer cannot understand a reason for abnormality. However, the customer can solve the abnormal state if the customer consults the store clerk according to the second warning operation and the store clerk appropriately copes with the abnormal state.

If ending ACT 63, ACT 64, or ACT 65, the processor 10*a* returns to the waiting state in ACT 51 to ACT 54 in FIG. 13.

If the notification data for the increase notification is received by the communication unit 10*d*, the processor 10*a* determines YES in ACT 53 in FIG. 13 and the process proceeds to ACT 66 in FIG. 14.

In ACT 66, the processor 10*a* determines a returning person who returns the increased commodity to the display rack 101. For example, the processor 10*a* extracts, from the tracking database DB2, all of the data records DR2 in which the monitoring flags set in the fields F22 are on and sets, as candidates of the returning person, all of tracked persons identified by the tracking IDs set in the fields F21 of the relevant data record DR2. If the customer takes out a commodity from the display rack 101, the customer extends an arm to the commodity, places the gripped commodity on the shelf plate 1*a*, and thereafter retracts the arm. Therefore, for example, the processor 10*a* operates to specify, based on an image photographed by the monitoring camera 3, a tracked person who performs the action explained above among the tracked persons set as the candidates of the returning person and determines the tracked person as the returning person.

More specifically, for example, the processor 10*a* operates to specify a person performing the action and determines a position of the person by analyzing changes of a plurality of images photographed by the monitoring camera 3 in a monitoring period determined in advance considering a period in which the action for returning a commodity is performed. The processor 10*a* selects, out of the extracted data records DR2, the data record DR2 in which a position indicated by detection data set in an end field is closest to the specified position. If a separation distance between the position indicated by the detection data set in the end field of the data record DR2 and the specified position is smaller than a specified distance, the processor 10*a* determines, as the returning person, the tracked person identified by the tracking ID set in the field F21 of the data record DR2. If the relevant tracked person cannot be found, the processor 10*a* determines that the returning person is unknown. The processor 10*a* may measure the length of an arm of the returning person based on a relation between the position indicated by the detection data set in the end field in the selected data record DR2 and a display position of the increased commodity and the image photographed by the monitoring camera 3 and, if the length is larger than a specified length, determine that the returning person is unknown.

If the commodity is returned, as in the case in which the commodity is taken, the monitoring period may need to start before the processor 10*a* receives the increase notification. Therefore, for example, the processor 10*a* buffers images photographed by the monitoring camera 3 in the auxiliary storage unit 10*c* or the like for a fixed period. After receiving the increase notification, the processor 10*a* analyzes images concerning the monitoring period from among the buffered images. Alternatively, the processor 10*a* may execute the processing in ACT 66 as processing of a thread different from the customer attendance processing.

In ACT 67, the processor 10*a* determines whether the processor 10*a* succeeds in the determination of the returning person. If succeeding in determining the returning person, the processor 10*a* determines YES and the process proceeds to ACT 68.

In ACT 68, the processor 10*a* determines whether member authentication is already performed about the tracked person determined as the returning person. The processor 10*a* finds, from the member management database DB3, the data record DR3 in which the same tracking ID as the tracking ID set in the field F21 of the data record DR2 selected in ACT 66 is set in the field F32. If the data record DR3 is found, the processor 10*a* determines YES and the process proceeds to ACT 69.

In ACT 69, the processor 10*a* requests the sales management device 102 to cancel the purchased commodity. For example, the processor 10*a* sends request data for the request to the intra-rack communication path 8 to be transmitted from the communication unit 10*d* to the sales management device 102. Then, the request data is relayed by the communication unit 7 and transmitted to the sales management device 102 via the communication network 104. The processor 10*a* includes, in the request data, identification data for identifying the cancellation request, a commodity code of a purchased commodity set as a target of the cancellation, the number of cancelled pieces, and a member ID. The processor 10*a* directly includes, in the request data, as the commodity code of the purchased commodity set as the target of the cancellation, the commodity code included in the received notification data. The processor 10*a* directly includes, in the request data, as the number of cancelled pieces, the decrease number included in the received notification data. The processor 10*a* includes, in the request data, the member ID set in the field F31 of the data record DR3 found in ACT 68.

If receiving the request data, the sales management device 102 performs cancellation processing for deleting, from purchased commodities of the member identified by the member ID included in the request data, by the number of cancelled pieces included in the request data, a commodity identified by the commodity code included in the request data. In this way, a customer registered as a member is allowed to freely return to the shelf 1 any commodity previously taken from the shelf 1. Consequently, the customer can select a commodity, which the customer is about to purchase, while taking the commodity from the shelf 1 and checking the commodity.

If determining in ACT 68 that the customer is not authenticated as a member, the processor 10*a* determines NO and the process proceeds to ACT 70. For example, if the data record DR3 in which the same tracking ID as the tracking ID set in the field F21 of the data record DR2 selected in ACT 66 is set in the field F32 cannot be found from the member management database DB3, the processor 10*a* determines that the customer is not authenticated as a member. This case occurs if a customer who does not understand a service provided by the transaction processing system 100 is surprised at the first warning operation performed regarding the taking of a commodity from the shelf 1 and thus returns the commodity to the shelf 1 in a fluster.

If failing in determining the returning person in ACT 66, the processor 10*a* determines NO in ACT 67 and the process proceeds to ACT 70. This case occurs if the processor 10*a* determines in ACT 66 that the returning person is unknown as explained above. The case also occurs if a person not tracked by the tracking processing because of some obstacle returns a commodity.

In ACT 70, the processor 10*a* performs a third warning operation. The third warning operation is for notifying a store clerk or the like that wrongful commodity return is performed and urging the store clerk or the like to cope with the wrongful commodity return. As the third warning operation, for example, the processor 10a instructs a terminal device used by the store clerk to perform screen display or voice message output. As the third warning operation, the processor 10a may perform any operation different from this operation or may perform a plurality of kinds of operations. Contents of a screen, a voice message, or the like may be decided as appropriate according to circumstances of the store in which the display rack 101 is set.

If the customer surprised at the first warning operation returns the commodity to the shelf 1 in a fluster as explained above, since there is no guarantee that the customer correctly returns the commodity to the original place, such an action is regarded as an abnormal state. If a tracked person who performs commodity take-out, which is a cause of the first warning operation, returns the same commodity to a correct position of the shelf 1 according to the first warning operation, this action may not be regarded as the abnormal state. Therefore, if the same commodity is returned by the tracked person, who causes the first warning operation, while the first warning operation is performed, the processor 10a may release the first warning operation without performing the third warning operation.

If ending ACT 69 or ACT 70, the processor 10a returns to the waiting state in ACT 51 to ACT 54 in FIG. 13.

If the exit flag set in the field F26 is changed from OFF to ON in any one of the data records DR2 included in the tracking database DB2, the processor 10a determines YES in ACT 54 in FIG. 13 and the process proceeds to ACT 71.

In ACT 71, the processor 10a determines whether a tracked person correlated with the exit flag changed to ON is authenticated as a member. The processor 10a selects, from the tracking database DB2, the data record DR2 in which the exit flag changed to ON is set in the field F26. The processor 10a finds, from the member management database DB3, the data record DR3 in which the same tracking ID as the tracking ID set in the field F21 of the selected data record DR2 is set in the field F32. The processor 10a determines YES if the data record DR3 is found and the process proceeds to ACT 72.

In ACT 72, the processor 10a requests the sales management device 102 to start settlement. For example, the processor 10a sends request data for the request to the intra-rack communication path 8 to be transmitted from the communication unit 10d to the sales management device 102. Then, the request data is relayed by the communication unit 7 and transmitted to the sales management device 102 via the communication network 104. The processor 10a includes, in the request data, identification data for identifying the request for the settlement start and a member ID set in the field F31 of the data record DR3 found in ACT 71. Thereafter, the processor 10a returns to the waiting state in ACT 51 to ACT 54.

If the tracked person is not authenticated as a member and the data record DR3 is not found, the processor 10a determines NO in ACT 71, passes the ACT 72, and returns to the waiting state in ACT 51 to ACT 54.

If receiving the request data, the sales management device 102 instructs the settlement device 103 to settle, concerning a member identified by the member ID included in the request data, a price concerning a commodity registered as a purchased commodity. If receiving the instruction, the settlement device 103 settles the price using settlement information registered concerning the member. Processing for the settlement may be processing for well-known settlement such as credit settlement or electronic money settlement. In this way, the settlement device 103 has a function of a settling section.

As explained above, the transaction processing system 100 determines a commodity taken from the shelf 1 by the tracked person as a purchased commodity concerning the tracked person based on a moving state of a commodity from the shelf 1 and an action of a tracked person in the purchase area AR1. Concerning a commodity taken from the shelf 1 by a tracked person authenticated as a member, the transaction processing system 100 determines the commodity as a purchased commodity by an authenticated member until leaving of the tracked person from the shelf 1 is detected and settles a price of the purchased commodity. Consequently, if a customer, who is a member, enters the purchase area and causes the UI unit 5 to read a member ID, the customer only has to carry away a commodity taken out from the shelf 1 and leave the shelf 1. Therefore, the customer does not need to perform operation for registering each commodity as a purchased commodity using devices such as a barcode reading terminal or the like. Additionally, the customer does not need to perform any operation for declaration for ending the registration of the purchased commodities. Transactions with a plurality of customers can be executed in parallel. Another customer does not need to wait until a transaction of one customer ends. Consequently, it is possible to achieve efficiency of transaction processing.

With the transaction processing system 100, it is possible to achieve unmanned transaction processing for some, if not all, commodities sold in the store. For example, in a retail store where store clerks are stationed, such as a convenience store or a supermarket, it is possible to reduce a burden on the store clerks by performing, using the transaction processing system 100, unmanned sales some commodities for sale, such as ready-made food (e.g., bento and onigiri), during a busy lunch break time or the like.

According to the rule in using the service, the customer basically stays in the purchase area AR1 while the customer takes a commodity from the shelf 1 that the customer intends to purchase. However, it is conceivable that a customer who does not take all commodities that the customer is about to purchase exits the purchase area AR1 because of various reasons such as avoiding other customers. Therefore, the transaction processing system 100 continues registration of purchased commodities even if a tracked person exits the purchase area AR1. The transaction processing system 100 determines that the tracked person leaves the shelf 1 if the tracked person exits the purchase area AR1 and moves to the preliminary area AR3 and the decision area AR4. The transaction processing system 100 regards commodities taken out from the shelf 1 by the tracked person to that point as purchased commodities and settles a price for the purchased commodities. Accordingly, even if the customer temporarily exits the purchase area AR1 without intending to finishing the taking of commodities, the customer can continue to take purchased commodities even after the exit.

If a tracked person who finishes member authentication is lost track of in the tracking processing, the transaction processing system 100 cannot detect that the tracked person leaves the shelf 1 because the tracked person moves to the decision area AR4. Therefore, if the tracked person who finishes the member authentication is lost track of in the tracking processing, the transaction processing system 100 also determines that the tracked person leaves the shelf 1. Consequently, it is possible to prevent a commodity taken from the shelf 1 before the tracked person was lost track of from being taken without being settled. However, even if a customer equivalent to the tracked person does not exit the purchase area AR1, the customer cannot continuously take out commodities from the shelf 1. However, since the second warning operation is performed if the customer takes out a commodity from the shelf 1, the customer can recognize that the customer is in a situation in which the customer cannot continue shopping.

Various modified implementations of the embodiment explained below are possible.

The exterior of the display rack 101 illustrated in FIG. 1 is an example. The display rack in the embodiment may be realized in any other form. For example, the display rack may be another type such as a trapezoidal type or an upper surface opening type. An open-closable door may be provided in an opening surface.

A door for enabling the opening surface to be closed may be provided for the purpose of heat insulation and cooling.

A condition for detecting that a tracked person leaves the shelf 1 can be changed as appropriate. For example, without considering the preliminary area AR3, it may be detected that the tracked person leaves the shelf 1 if the tracked person simply enters the decision area AR4. For example, it may be detected that the tracked person leaves the shelf 1 if the position of the tracked person once located in the purchase area AR1 changes to the outside of the purchase area AR1.

The tracking processing, the monitoring processing, or the customer attendance processing may be performed as distributed processing by a plurality of computers. All of the tracking processing, the monitoring processing, and the customer attendance processing may be processed by the same computer. The tracking processing and the customer attendance processing may be respectively processed by different computers. The tracking processing and the monitoring processing may be processed by a computer different from a computer that processes the customer attendance processing or the tracking processing may be processed by a computer different from a computer that processes the monitoring processing and the customer attendance processing.

The processor 9*a* or the processor 10*a* may execute at least a part of the registration processing in the sales management device 102. The processor 9*a* or the processor 10*a* may execute at least a part of the settlement processing in the settlement device 103. The sales management device 102 may execute at least a part of the customer attendance processing.

Even if member authentication is finished, settlement may be performed in the checkout corner where a store clerk stays or the checkout corner of the self-service type.

A purchased commodity may be correlated with a tracking ID and registered. If member authentication is performed after commodity registration is started, a member ID may be correlated with the purchased commodity. Alternatively, the settlement device set in the tracking area may perform settlement of a purchased commodity correlated with a tracked person located in an area corresponding to the settlement device.

A tracking target person may be identified by the member ID without using the tracking ID.

Authentication of a member may be performed by biological authentication such as face authentication based on images photographed by the tracking cameras 2.

A part or all of the functions realized by the processor 5*c*, 9*a*, or 10*a* with the information processing can also be realized by hardware that executes information processing not based on a program such as a logic circuit. Each of the functions can also be realized by combining software control with the hardware such as the logic circuit.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A transaction processing system, comprising:
   a sensing device configured to detect displacement of a commodity item from a commodity display rack;
   one or more cameras configured to capture images of areas around the commodity display rack; and
   a processor configured to:
   track a location of each of one or more customers who is determined to have entered a first area in front of the commodity display rack based on the captured images;
   upon detection of the displacement of the commodity item by the sensing device, perform an operation to determine a purchasing customer of the commodity item based on the tracked location of each of the one or more customers, and cause purchase registration of the commodity item in association with an ID of the purchasing customer; and
   cause settlement processing for the commodity item using payment information associated with the ID of the purchasing customer when the customer is determined to have entered a second area around the first area,
   the first area being completely surrounded by an area of the commodity display rack and the second area, and the first area being separated from the second area having no overlap with the second area.

2. The transaction processing system according to claim 1, wherein the processor is configured to determine, as the purchasing customer, a customer whose tracked location is closest to and within a predetermined distance from the commodity display rack during a predetermined time period before the detection of the displacement of the commodity item.

3. The transaction processing system according to claim 1, wherein the processor is configured to assign a tracking ID to each of the one or more customers when the customer is determined to have entered a third area around the first area based on the captured images and track the location of the customer in association with the assigned tracking ID, the second area being around the third area.

4. The transaction processing system according to claim 3, wherein there is no overlap between the first area and the third area.

5. The transaction processing system according to claim 3, further comprising:
   a user interface configured to perform an operation to receive a customer ID of a customer, the user interface provided in the first area, wherein
   the processor is configured to store the customer ID in association with a tracking ID assigned thereto.

6. The transaction processing system according to claim 3, wherein the processor is configured to stop tracking the location of each of one or more customers who is determined to have entered the first area when the customer is determined to have entered the second area.

7. The transaction processing system according to claim 6, wherein there is no overlap between the second area and the third area.

8. The transaction processing system according to claim 1, wherein the processor is configured to stop tracking the location of each of one or more customers who is determined to have entered the first area when the tracked location of the customer is not updated for a predetermined period of time.

9. The transaction processing system according to claim 1, further comprising:
a user interface provided in the first area,
wherein the processor is configured to control the user interface to generate a first notification when the purchasing customer is not authenticated and a second notification when the purchasing customer is not determined through the operation, the second notification being different from the first notification.

10. The transaction processing system according to claim 1, wherein
the sensing device is further configured to detect placement of the commodity item to the commodity display rack, and
the processor is configured to, upon detection of the placement of the commodity item by the sensing device, perform a second operation to determine a commodity-returning customer of the commodity item based on the tracked location of each of the one or more customers, and cause purchase deregistration of the commodity item in association with an ID of the commodity-returning customer.

11. The transaction processing system according to claim 10, further comprising:
a user interface provided in the first area,
wherein the processor is configured to control the user interface to generate a first notification when the purchasing customer is not authenticated, a second notification when the purchasing customer is not determined through the operation, and a third notification when the commodity-returning customer is not authenticated and when the commodity-returning customer is not determined through the second operation, the first, second, and third notifications being different from each other.

12. The transaction processing system according to claim 1, wherein the sensing device includes a weight scale.

13. The transaction processing system according to claim 1, further comprising:
a projector configured to project a region image corresponding to the first area onto a floor.

14. The transaction processing system according to claim 13, wherein the projector is also configured to project a text describing the first area onto the floor.

15. The transaction processing system according to claim 3, wherein the third area extends along edges of the first area.

16. A method for processing a transaction using a sensing device configured to detect displacement of a commodity item from a commodity display rack and one or more cameras configured to capture images of areas around the commodity display rack, the method comprising:
tracking a location of each of one or more customers who is determined to have entered a first area in front of the commodity display rack based on the captured images;
upon detection of the displacement of the commodity item by the sensing device, performing an operation to determine a purchasing customer of the commodity item based on the tracked location of each of the one or more customers, and causing purchase registration of the commodity item in association with an ID of the purchasing customer;
causing settlement processing for the commodity item using payment information associated with the ID of the purchasing customer when the customer is determined to have entered a second area around the first area,
the first area being completely surrounded by an area of the commodity display rack and the second area, and the first area being separated from the second area having no overlap with the second area.

17. The method according to claim 16, wherein a customer whose tracked location is closest to and within a predetermined distance from the commodity display rack during a predetermined time period before the detection of the displacement of the commodity item is determined as the purchasing customer.

18. The method according to claim 16, further comprising:
assigning a tracking ID to each of the one or more customers when the customer is determined to have entered a third area around the first area based on the captured images, wherein the location of each of the one or more customers is tracked in association with the assigned tracking ID, the second area being around the third area.

19. The method according to claim 16, wherein
the sensing device is further configured to detect placement of the commodity item to the commodity display rack, and
the method further comprises, upon detection of the placement of the commodity item by the sensing device, performing a second operation to determine a commodity-returning customer of the commodity item based on the tracked location of each of the one or more customers, and causing purchase deregistration of the commodity item in association with an ID of the commodity-returning customer.

20. The method according to claim 16, further comprising:
projecting a region image corresponding to the first area onto a floor.

* * * * *